(12) United States Patent
Saito et al.

(10) Patent No.: US 11,018,920 B2
(45) Date of Patent: May 25, 2021

(54) USER TERMINAL AND WIRELESS COMMUNICATION METHOD

(71) Applicant: NTT DOCOMO, INC., Tokyo (JP)

(72) Inventors: Keisuke Saito, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 152 days.

(21) Appl. No.: 16/473,965

(22) PCT Filed: Dec. 1, 2017

(86) PCT No.: PCT/JP2017/043281
§ 371 (c)(1),
(2) Date: Jun. 26, 2019

(87) PCT Pub. No.: WO2018/123441
PCT Pub. Date: Jul. 5, 2018

(65) Prior Publication Data
US 2019/0349240 A1    Nov. 14, 2019

(30) Foreign Application Priority Data

Dec. 26, 2016   (JP) .............................. JP2016-252004

(51) Int. Cl.
*H04L 27/26*   (2006.01)
*H04L 5/00*    (2006.01)
*H04W 28/06*   (2009.01)

(52) U.S. Cl.
CPC ........ *H04L 27/2666* (2013.01); *H04L 5/0048* (2013.01); *H04L 27/2621* (2013.01); *H04L 27/2628* (2013.01); *H04W 28/06* (2013.01)

(58) Field of Classification Search
CPC .............. H04L 27/2666; H04L 5/0048; H04L 27/2621; H04L 27/2628; H04L 27/2655;
(Continued)

(56) References Cited

U.S. PATENT DOCUMENTS

2014/0226636 A1* 8/2014 Xu ...................... H04W 72/042
                                                           370/336
2017/0279647 A1* 9/2017 Yang ..................... H04L 5/0094

FOREIGN PATENT DOCUMENTS

JP       2007151056 A    6/2007
JP       2010183622 A    8/2010

OTHER PUBLICATIONS

International Search Report issued for PCT/JP2017/043281, dated Feb. 20, 2018 (5 pages).

(Continued)

*Primary Examiner* — Hardikkumar D Patel
(74) *Attorney, Agent, or Firm* — Osha Bergman Watanabe & Burton LLP

(57) ABSTRACT

In user terminal 20, reception section 202 and signal separation section 204 receive a data signal and a demodulation reference signal mapped to a downlink resource, and demodulation and decoding section 208 uses the demodulation reference signal to demodulate the data signal. A correction reference signal is mapped to the downlink resource according to a parameter related to user terminal 20 signaled to user terminal 20. Reception section 202 and signal separation section 204 specify a mapping pattern of the correction reference signal based on the parameter, and demodulation and decoding section 208 uses the correction reference signal to demodulate the data signal.

13 Claims, 8 Drawing Sheets

(58) Field of Classification Search
CPC ..... H04L 5/0053; H04L 27/26; H04L 27/261; H04L 25/0224; H04L 27/2626; H04L 5/00; H04L 5/14; H04L 7/00; H04L 27/2692; H04W 28/06; H04W 72/04; H04W 48/16; H04J 11/0069
See application file for complete search history.

(56) References Cited

OTHER PUBLICATIONS

Written Opinion issued for PCT/JP2017/043281, dated Feb. 20, 2018 (10 pages).
Nokia, Alcatel-Lucent Shanghai Bell; "On considerations for NR DM-RS for data channels"; 3GPP TSG-RAN WG1#87 R1-1612857; Reno, USA, Nov. 14-18, 2016 (14 pages).
Ericsson; "Design considerations for phase noise tracking RS (PTRS)"; 3GPP TSG-RAN WG1 #87 R1-1612333; Reno, USA, Nov. 14-18, 2016 (4 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
Qualcomm et al.; "Way Forward on Frame Structure"; 3GPP TSG RAN WG1 #85 R1-165575; Nanjing, China, May 23-27, 2016 (2 pages).
Extended European Search Report in counterpart European Application No. 17885886.6 dated Jun. 22, 2020 (11 pages).
LG Electronics; "Discussion on Phase Tracking RS for Multi-Antenna"; 3GPP TSG RAN WG1 #87, R1-1611811; Reno, USA; Nov. 14-18, 2016 (6 pages).
Nokia, Alcatel-Lucent Shanghai Bell; "On RS Design for Phase Tracking in NR"; 3GPP TSG-RAN WG1#87 R1-1612860; Reno, USA, Nov. 14-18, 2016 (12 pages).
NTT DOCOMO, Inc; "Views on RS for phase tracking"; 3GPP TSG-RAN WG1#87 R1-1612720; Reno, USA, Nov. 14-18, 2016 (5 pages).

* cited by examiner

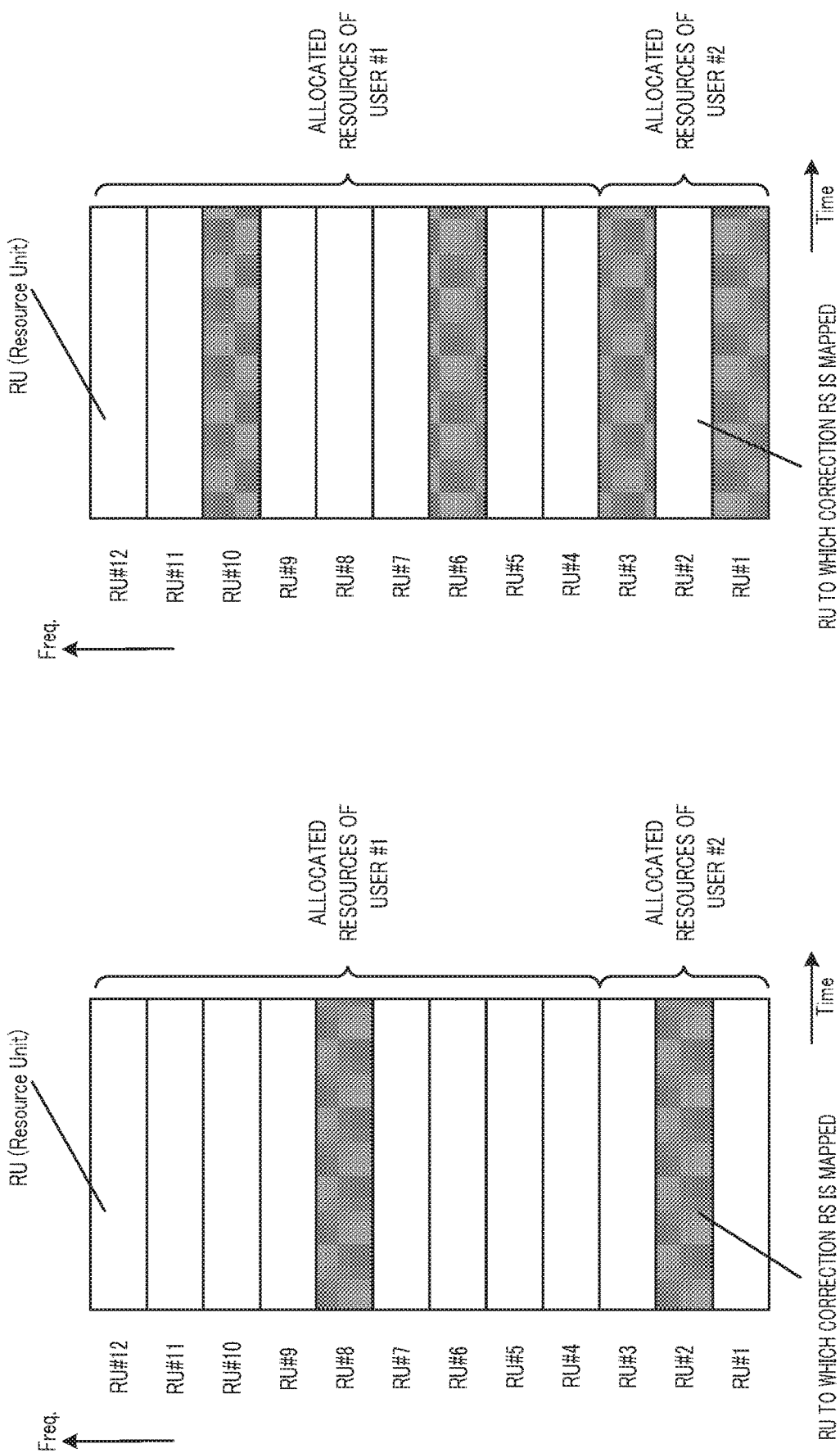

USER TERMINAL AND WIRELESS COMMUNICATION METHOD

TECHNICAL FIELD

The present invention relates to a user terminal and a radio communication method in a next-generation mobile communication system.

BACKGROUND ART

In a UMTS (Universal Mobile Telecommunications System) network, Long Term Evolution (LTE) is specified for a higher data rate, lower latency, and the like (NPL 1). For a broader bandwidth and a higher speed based on LTE, successor systems of LTE are also studied (for example, the systems are called LTE-A (LTE-Advanced), FRA (Future Radio Access), 5G (5th generation mobile communication system), 5G+ (5G plus), and New-RAT (Radio Access Technology)).

Using a broadband frequency spectrum is studied for the radio communication system of the future (for example, 5G) to meet the demands, such as ultra-high speed, large capacity, and ultra-low latency. Therefore, using a frequency band (for example, 30 to 70 GHz band) higher than the frequency band used in the existing LTE system and using a Massive MIMO (Multiple Input Multiple Output) with a large number of antenna elements are studied in the radio communication system of the future.

Mapping a demodulation reference signal (for example, DMRS (Demodulation Reference Signal), hereinafter may also be referred to as "demodulation RS") on the forward side of a subframe is studied in the radio communication system of the future to reduce the processing time required for channel estimation and signal demodulation in the subframe (NPL 2).

CITATION LIST

Non-Patent Literature

NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016
NPL 2
R1-165575, Qualcomm, Ericsson, Panasonic, NTT Docomo, ZTE, Convida, Nokia, ASB, Sony, Intel, "Way Forward On Frame Structure," May 2016.

SUMMARY OF INVENTION

Technical Problem

In a case where the demodulation RS is mapped on the forward side of the subframe, the time variation of the channel cannot be followed in a user terminal (UE: User Equipment) if a channel estimation value based on the demodulation RS is simply used to perform demodulation. The channel estimation accuracy is deteriorated due to the influence of temporal variation of the phase (phase variation) in this case. Therefore, a correction reference signal (hereinafter, may also be referred to as "correction RS") for correcting the phase variation may be mapped in the subframe. However, the mapping method of the correction RS is not sufficiently studied.

An aspect of the present invention is to provide a user terminal and a radio communication method each enabling efficient mapping of a correction RS.

Solution to Problem

An aspect of the present invention provides a user terminal including: a reception section that receives a data signal and a demodulation reference signal both mapped to a downlink resource; and a demodulation section that demodulates the data signal using the demodulation reference signal, in which a correction reference signal is mapped to the downlink resource according to a parameter related to the user terminal, the parameter being signaled to the user terminal, the reception section specifies a mapping pattern of the correction reference signal based on the parameter, and the demodulation section demodulates the data signal using the correction reference signal.

Advantageous Effects of Invention

According to the aspect of the present invention, the correction RS can be efficiently mapped.

BRIEF DESCRIPTION OF DRAWINGS

FIG. 5A illustrates a mapping example of the correction RS according to Embodiment 3;
FIG. 5B illustrates a mapping example of the correction RS according to Embodiment 3.

DESCRIPTION OF EMBODIMENTS

Hereinafter, embodiments of the present invention will be described in detail with reference to the accompanying drawings.

Embodiment 1

As described above, when the demodulation RS is mapped on the forward side of the subframe the correction RS for correcting the phase variation can be mapped. The user terminal can use the correction RS to correct the phase variation and estimate the channel, and the method can reduce the deterioration of the channel estimation accuracy.

The influence of phase noise varies depending on various parameters (for example, carrier frequency, modulation scheme, and the like) that are to be set to the user terminal. For example, when the carrier frequency and the modulation scheme (modulation level or MCS (Modulation and Coding Scheme) index) are low, the influence of the phase noise is relatively small. On the other hand, when the carrier frequency and the modulation scheme are high, the influence of the phase noise is relatively large.

Therefore, when the influence of the phase noise is relatively small, it is likely that the user terminal can accurately execute demodulation processing without using the correction RS. Thus, when the influence of the phase noise is relatively small, the correction RS for the user terminal is not necessary.

Therefore, if, for example, the correction RS is mapped (inserted) in each subframe, there is a problem in that an increase in the overhead of the correction RS causes a reduction in the throughput in the user terminal in which the correction RS is not necessary.

Thus, whether to map the correction RS (that is, on/off of mapping) is decided based on parameters signaled to the user terminal in the present embodiment.

<Radio Communication System>

Figure 1:
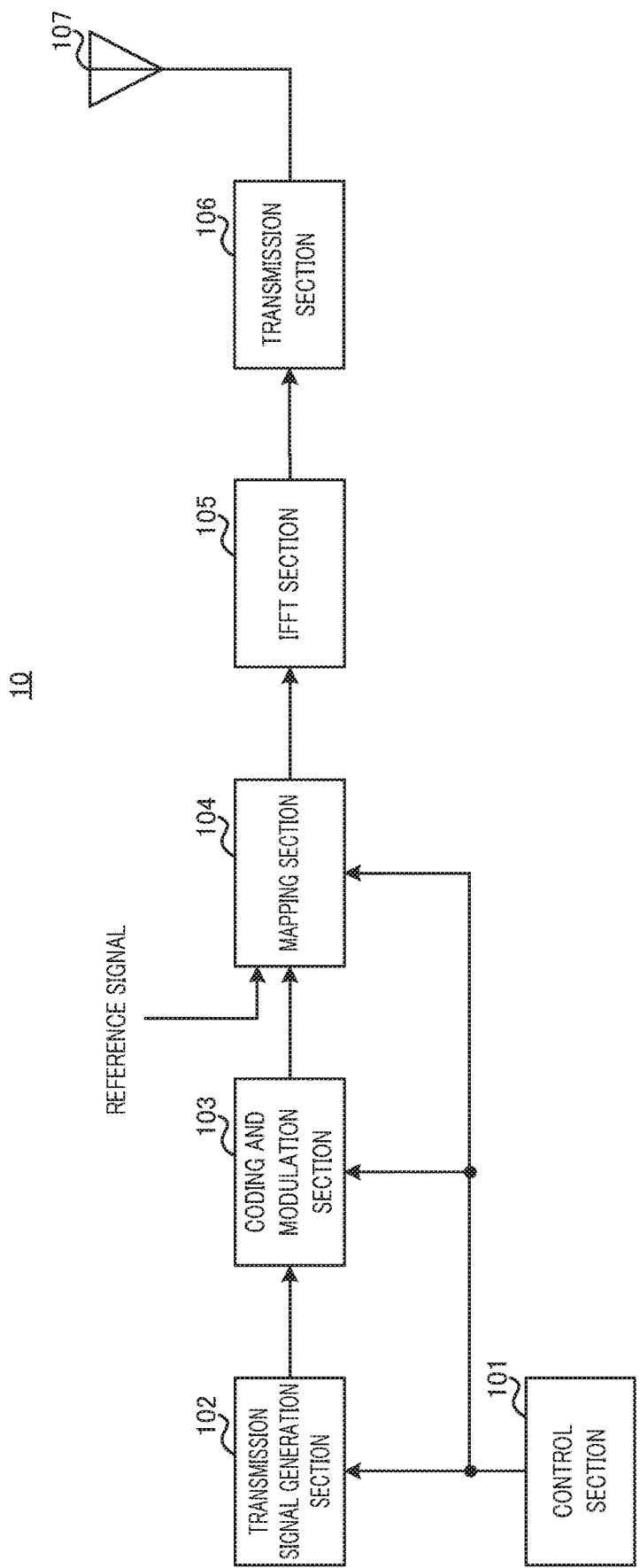
FIG. 1 is a block diagram showing a configuration example of a radio base station according to Embodiment 1.
Figure 2:
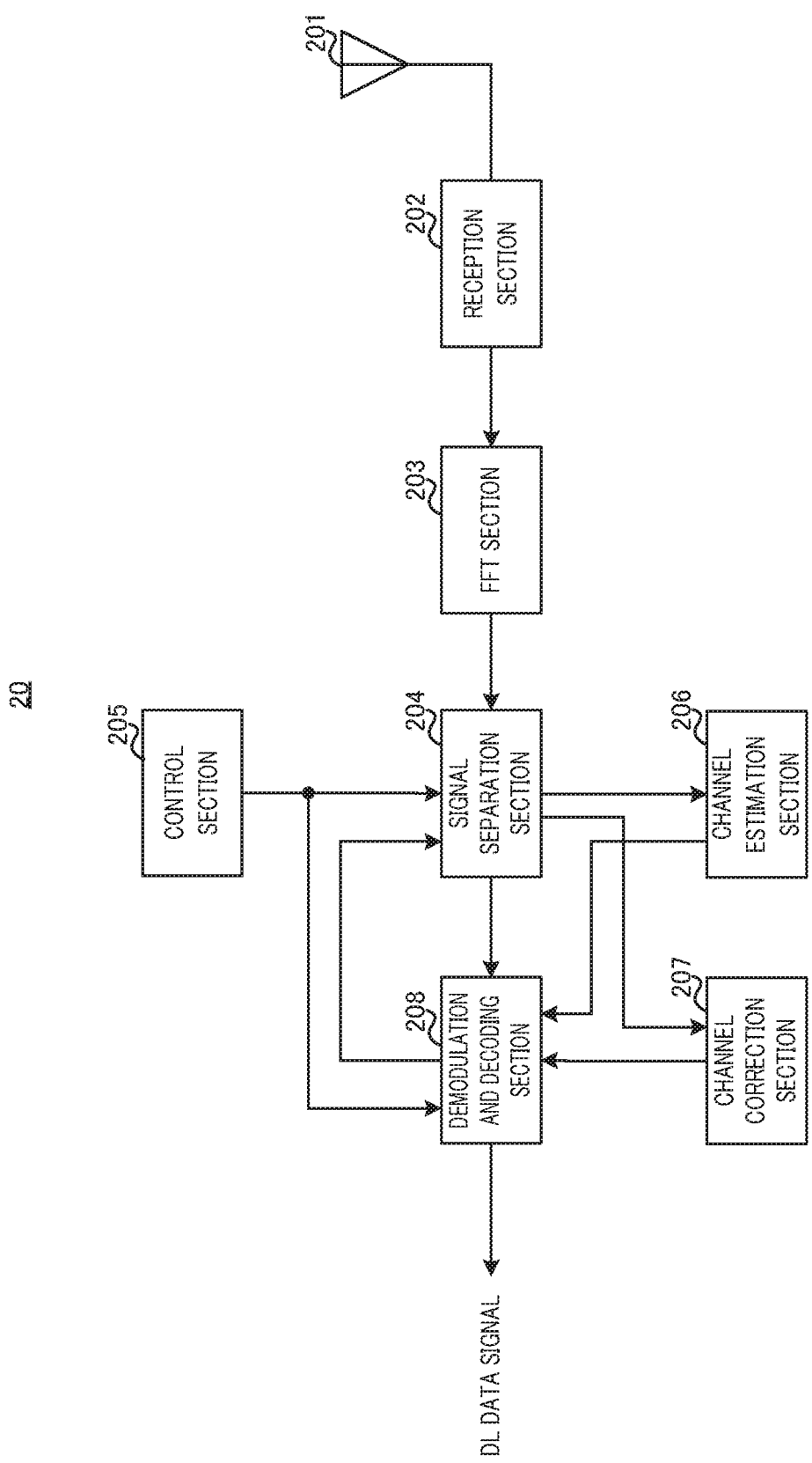
FIG. 2 is a block diagram showing a configuration example of a user terminal according to Embodiment 1.

A radio communication system according to the present embodiment includes at least radio base station 10 shown in FIG. 1 and user terminal 20 shown in FIG. 2. User terminal 20 is connected to (accesses) radio base station 10. Radio base station 10 transmits a DL control signal to user terminal 20 using a downlink control channel (for example, PDCCH: Physical Downlink Control Channel) and transmits a DL data signal, a demodulation RS, and a correction RS to user terminal 20 using a downlink data channel (for example, PDSCH: Physical Downlink Shared Channel).

<Radio Base Station>

FIG. 1 illustrates an example of an overall configuration of the radio base station according to the present embodiment. Radio base station 10 shown in FIG. 1 includes control section 101, transmission signal generation section 102, coding and modulation section 103, mapping section 104, IFFT (Inverse Fast Fourier Transform) section 105, transmission section 106, and antenna 107.

Control section 101 (scheduler) performs scheduling (for example, resource assignment) of the DL data signal, the DL control signal, the demodulation RS, the correction RS, and the like. Control section 101 performs scheduling to map the demodulation RS on the top symbol of each subframe and to map the correction RS to a predetermined symbol other than the top symbol in a predetermined subcarrier of each subframe. Control section 101 also configures whether to map the correction RS (mapping pattern) for user terminal 20 based on information (parameters) configured to user terminal 20. Note that details of the mapping (placement) configuration of the correction RS will be described later.

Control section 101 outputs scheduling information indicating a scheduling result to transmission signal generation section 102 and mapping section 104.

Control section 101 also configures the MCS (such as code rate and modulation scheme) of the DL data signal based on, for example, the channel quality between radio base station 10 and terminal 20 and outputs the MCS information to transmission signal generation section 102 and coding and modulation section 103. Note that the MCS for the DL data signal may not only be configured by radio base station 10, but may also be configured by user terminal 20 as described later. When user terminal 20 configures the MCS, radio base station 10 can receive the MCS information from user terminal 20 (not illustrated).

Transmission signal generation section 102 generates a transmission signal (including a DL data signal and a DL control signal). For example, the DL control signal includes downlink control information (DCI) including the scheduling information (for example, resource assignment information of DL data signal) or the MCS information output from control section 101. Transmission signal generation section 102 outputs the generated transmission signal to coding and modulation section 103.

Coding and modulation section 103 performs encoding processing and modulation processing on the transmission signal input from transmission signal generation section 102 based on, for example, the MCS information input from control section 101. Coding and modulation section 103 outputs the modulated transmission signal to mapping section 104.

Mapping section 104 maps the transmission signal input from coding and modulation section 103 to a predetermined radio resource (downlink resource) based on the scheduling information input from control section 101. Mapping section 104 also maps the reference signal (demodulation RS or correction RS) to a predetermined radio resource (downlink resource) based on the scheduling information. Note that the correction RS may be, for example, a reference signal specific to each user terminal 20 (UE specific RS) or a reference signal common to user terminals 20 (common RS). Mapping section 104 outputs the DL signal mapped to the radio resource to IFFT section 105.

IFFT section 105 performs IFFT processing on the DL signal that is a frequency domain signal input from mapping section 104 and outputs the DL signal that is a time domain signal (that is, a signal constituted by OFDM symbol) to transmission section 106. Note that a signal waveform based on OFDM modulation is used as an example of the signal waveform of the DL signal in FIGS. 1 and 2. However, the signal waveform of the DL signal is not limited to this, and the signal waveform may be based on other systems (for example, SC-FDMA (Single Carrier-Frequency Division Multiple Access) or DFT-S-OFDM (DFT-Spread-OFDM)).

Transmission section 106 performs transmission processing, such as up-conversion and amplification, on the baseband DL signal input from IFFT section 105 and transmits the radio frequency signal (DL signal) from antenna 107.

<User Terminal>

FIG. 2 illustrates an example of the overall configuration of the user terminal according to the present embodiment. User terminal 20 shown in FIG. 2 includes antenna 201, reception section 202, FFT (Fast Fourier Transform) section 203, signal separation section 204, control section 205, channel estimation section 206, channel correction section 207, and demodulation and decoding section 208.

Reception section 202 performs reception processing, such as amplification and down-conversion, on the radio frequency signal (DL signal) received by antenna 201 and outputs the baseband DL signal to FFT section 203.

FFT section 203 performs FFT processing on the DL signal that is a time domain signal input from reception section 202 and outputs the DL signal that is a frequency domain signal to signal separation section 204.

Signal separation section 204 separates (demaps) the DL control signal, the demodulation RS, and the correction RS from the DL signal input from FFT section 203, outputs the demodulation RS to channel estimation section 206, outputs the correction RS to channel correction section 207, and outputs the DL control signal to demodulation and decoding section 208. Note that signal separation section 204 specifies the mapping configuration (mapping pattern) of the correction RS based on the parameters configured to user terminal 20. Details of the mapping (placement) method of the correction RS will be described later. Furthermore, the correction RS may be output to channel estimation section 206 along with the demodulation RS.

Signal separation section 204 also separates (demaps) the DL data signal from the DL signal based on the scheduling information (for example, resource assignment information) input from demodulation and decoding section 208 and outputs the DL data signal to demodulation and decoding section 208.

Control section 205 configures the MCS (code rate and modulation scheme) used for encoding and modulation of the DL data signal based on, for example, the channel quality between radio base station 10 and terminal 20 and outputs the MCS information to signal separation section 204 and demodulation and decoding section 208. Note that as described above, the MCS for the DL data signal may be configured by radio base station 10 and transmitted to user terminal 20 through the DL control signal, or the MCS may be configured by user terminal 20 (control section 205).

Channel estimation section 206 performs channel estimation using the demodulation RS (and the correction RS) input from signal separation section 204 and outputs channel estimation values as estimation results to demodulation and decoding section 208.

Channel correction section 207 performs channel estimation using the correction RS input from signal separation section 204 and calculates the phase variation (time variation) using a method of calculating differences between the channel estimation values of the symbols. Channel correction section 207 outputs the phase variation to demodulation and decoding section 208.

Demodulation and decoding section 208 demodulates the DL control signal input from signal separation section 204. Note that to reduce the delay time, demodulation and decoding section 208 may demodulate the DL control signal using only the channel estimation values without using the phase variation. Demodulation and decoding section 208 also performs decoding processing (for example, blind detection processing) on the demodulated DL control signal. Demodulation and decoding section 208 outputs, to signal separation section 204, the control information such as scheduling information addressed to user terminal 20 of demodulation and decoding section 208 obtained by decoding the DL control signal.

Demodulation and decoding section 208 also demodulates the DL data signal input from signal separation section 204 based on the channel estimation values input from channel estimation section 206, the phase variation input from channel correction section 207, and the MCS input from control section 205. Specifically, demodulation and decoding section 208 corrects the channel estimation value of the resource (for example, subcarrier) provided with the DL data signal to be demodulated according to the phase variation. Demodulation and decoding section 208 performs channel compensation (equalization processing) of the signal to be demodulated using the corrected channel estimation value and demodulates the DL data signal after the channel compensation. Demodulation and decoding section 208 also decodes the demodulated DL data signal based on, for example, the MCS input from control section 205 and transfers the obtained reception data to an application section (not illustrated). Note that the application section executes processing and the like related to a layer higher than the physical layer and the MAC layer.

<Operation of Radio Base Station 10 and User Terminal 20>

Next, operation of radio base station 10 and user terminal 20 will be described in detail.

Figure 3B:
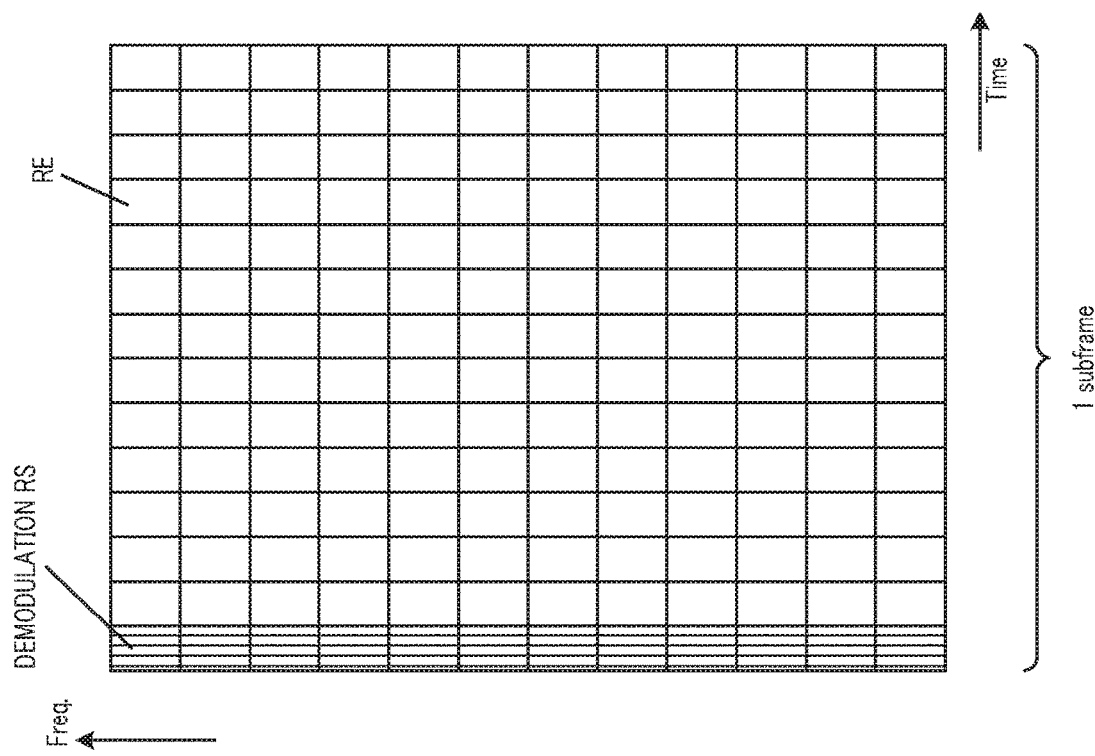
FIG. 3B illustrates a mapping example when the correction RS is not transmitted according to Embodiment 1.
Figure 3A:
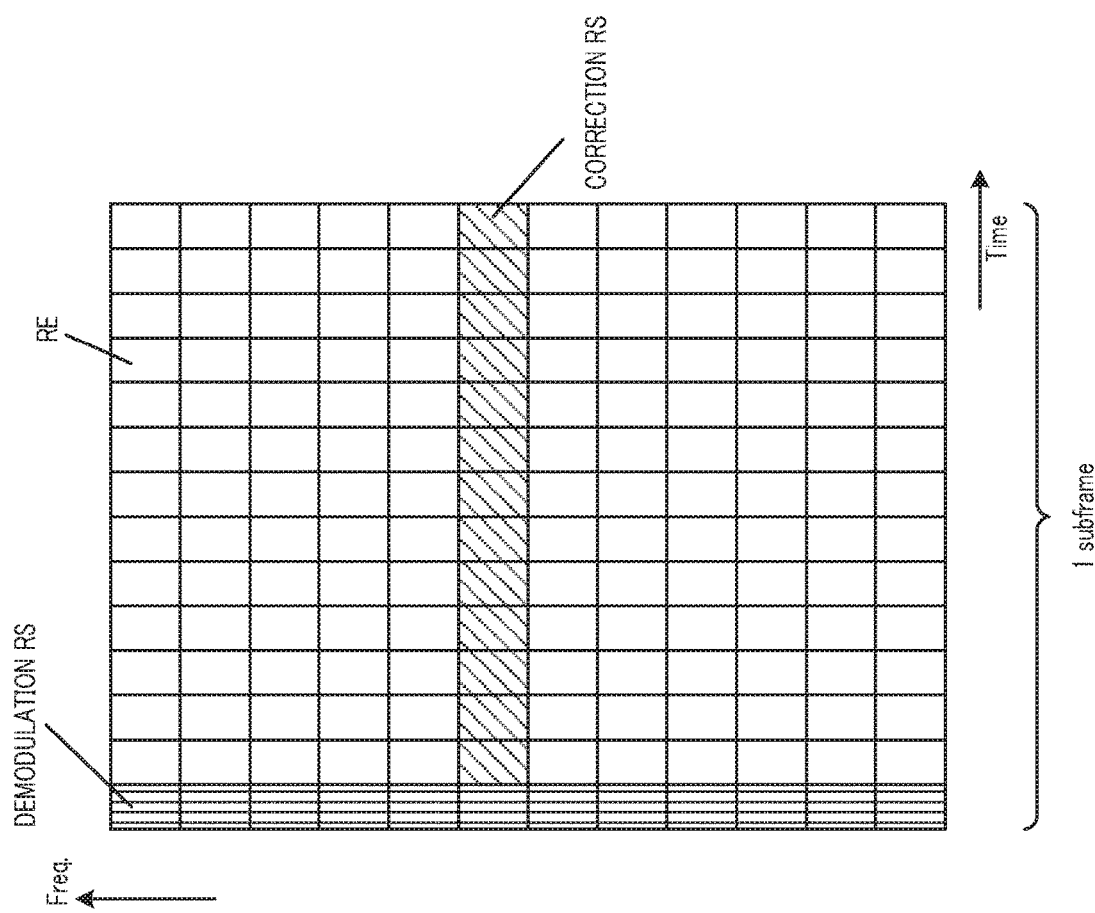
FIG. 3A illustrates a mapping example when a correction RS is transmitted according to Embodiment 1.

FIGS. 3A and 3B illustrate mapping examples of the demodulation RS and the correction RS according to the present embodiment.

Each block shown in FIGS. 3A and 3B indicates 1 RE that is a radio resource region defined by 1 symbol and 1 subcarrier. In FIGS. 3A and 3B, 1 subframe includes 14 symbols. In FIGS. 3A and 3B, a resource unit (RU, also called a resource block, a resource block pair, and the like) as an assignment unit of resources is defined by 168 REs (Resource Elements) constituted by 14 symbols and 12 subcarriers.

In FIGS. 3A and 3B, only the demodulation RS and the correction RS are illustrated, and the DL data signal mapped in the subframe is not illustrated. FIG. 3A illustrates an example in which the correction RS is mapped (mapping pattern), and FIG. 3B illustrates an example in which the correction RS is not mapped.

As shown in FIGS. 3A and 3B, the demodulation RS is mapped in the frequency direction of the first symbols (top symbols) of the subframe. When the correction RS is transmitted to user terminal 20, the correction RS is mapped to the second and subsequent symbols of the subframe as shown in FIG. 3A.

In the present embodiment, whether to map the correction RS for user terminal 20 is decided based on the parameters (details will be described later) related to user terminal 20 signaled to user terminal 20.

Therefore, radio base station 10 decides whether to map the correction RS (on/off configuration of correction RS) according to the parameters configured to user terminal 20.

User terminal 20 determines whether the correction RS is mapped or not according to the parameters (details will be described later) configured to user terminal 20. When user terminal 20 determines that the correction RS is mapped as shown for example in FIG. 3A, user terminal 20 extracts the correction RS from the DL signal and corrects the channel estimation values using the correction RS. User terminal 20 demodulates the DL data signal using the corrected channel estimation value. User terminal 20 can improve the channel estimation accuracy based on the method of correcting the phase variation using the correction RS shown in FIG. 3A.

On the other hand, when user terminal 20 determines that the correction RS is not mapped as shown in FIG. 3B, user terminal 20 does not correct the channel estimation value and demodulates the DL data signal using the channel estimation value calculated from the demodulation RS. Here, for example, the DL data signal may be mapped in FIG. 3B instead of mapping the correction RS as in FIG. 3A. More specifically, since the DL data signal is mapped for user terminal 20 instead of the correction RS in FIG. 3B, the overhead of the correction RS can be reduced, and the throughput can be improved.

In this way, the more the correction RS is mapped in the subframe, the more the channel estimation accuracy improves due to the correction of the phase variation. On the other hand, the ratio of the correction RS in the subframe becomes high, and the overhead increases. In other words, the less the correction RS in the subframe, the lower the ratio of the correction RS in the frame. Therefore, the overhead decreases. On the other hand, the degree of improvement in the channel estimation accuracy due to the correction of the phase variation becomes small. Therefore, there is a trade-off relationship between the channel estimation accuracy and the overhead according to the ratio of the correction RS mapped in the RU.

For example, focusing on the channel estimation accuracy, the correction RS does not have to be mapped when sufficient channel estimation accuracy can be obtained in user terminal 20 based on the demodulation RS. Therefore, it is preferable to map the correction RS for user terminal 20 when sufficient channel estimation accuracy cannot be obtained in user terminal 20 based on the demodulation RS, thereby improving the channel estimation accuracy resulting from the correction RS and improving the throughput.

Focusing on the overhead, when a predetermined number of correction RSs are mapped, the smaller the amount of resources assigned to user terminal 20, the higher the ratio of the correction RSs to the assigned resources. Therefore, the throughput in user terminal 20 is reduced. Therefore, it is preferable in this case to prioritize the improvement of the throughput resulting from the reduction in the overhead of the correction RS over the improvement of the channel estimation accuracy resulting from the correction RS.

Therefore, in the present embodiment, the mapping method of the correction RS (whether to map the correction RS) may be configured based on the parameters configured to each user terminal 20 according to, for example, which one of the improvement in the channel estimation accuracy and the reduction in the overhead is to be prioritized. For example, whether to map the correction RS may be configured according to the parameters configured to user terminal 20 to reduce the overhead while securing required channel estimation accuracy.

Examples of the parameters related to user terminal 20 for deciding the mapping configuration of the correction RS include the following parameters.

(1) Modulation Scheme or MCS Index

The correction RS may be mapped as in FIG. 3A when the modulation scheme configured to user terminal 20 is high (for example, when the modulation level is equal to or greater than a threshold), and the correction RS may not be mapped as in FIG. 3B when the modulation scheme is low (for example, when the modulation level is smaller than the threshold). The threshold may be, for example, 16 QAM or may be another value. As described above, the modulation scheme or the MCS index may be indicated from radio base station 10 to user terminal 20 or may be configured by user terminal 20.

When the modulation scheme is low (such as BPSK and QPSK), the influence of the phase variation on the constellation where signal points are placed is smaller than when the modulation scheme is high (such as 16 QAM, 64 QAM, and 256 QAM). Therefore, when the modulation scheme is low, user terminal 20 can obtain sufficient channel estimation accuracy based on the demodulation RS without correcting the phase variation based on the correction RS. More specifically, the correction RS is not mapped as in FIG. 3B when the modulation scheme is low, and user terminal 20 can receive a more DL data signal to reduce the overhead of the correction RS and improve the throughput. Therefore, when the modulation scheme configured to user terminal 20 is low, user terminal 20 can reduce the overhead of the correction RS and improve the throughput while securing the channel estimation accuracy.

On the other hand, when the modulation scheme configured to user terminal 20 is high, user terminal 20 can improve the channel estimation accuracy based on the method of correcting the phase variation using the correction RS as shown in FIG. 3A.

Note that when multi-layer transmission is performed for user terminal 20, the mapping configuration of the correction RS may be commonly configured for a plurality of layers or may be specifically configured for each layer.

For example, the mapping of the correction RS based on the lowest modulation scheme (or MCS index) among the plurality of layers may be commonly configured for the plurality of layers. The processing can reduce the overhead caused by the correction RS in the entire layers. Alternatively, the mapping of the correction RS based on the highest modulation scheme (or MCS index) among the plurality of layers may be commonly configured for the plurality of layers. The processing can obtain sufficient channel estimation accuracy in all of the layers, and user terminal 20 can normally demodulate the DL data signal.

Alternatively, the mapping of the correction RS may be configured for each of a plurality of layers according to the modulation scheme configured for each of the plurality of layers. The processing can reduce the overhead of the correction RS while securing the channel estimation accuracy required in each of the plurality of layers.

(2) The Number of Multiplexed Layers

The correction RS may be mapped as in FIG. 3A when the number of multiplexed layers configured to user terminal 20 is large (for example, when the number of multiplexed layers is equal to or greater than a threshold), and the correction RS may not be mapped as in FIG. 3B when the number of multiplexed layers is small (for example, when the number of multiplexed layers is smaller than the threshold).

The larger the number of multiplexed layers, the higher the required channel estimation accuracy. Therefore, user terminal 20 can improve the channel estimation accuracy based on the method of correcting the phase variation using the correction RS mapped to symbols subsequent to the demodulation RS as in FIG. 3A. On the other hand, the smaller the number of multiplexed layers, the lower the required channel estimation accuracy. Sufficient channel estimation accuracy can be obtained based on the demodulation RS. Since the correction RS is not mapped, user terminal 20 can receive a more DL data signal as shown in FIG. 3B, and the throughput can be improved while the required channel estimation accuracy is secured.

Alternatively, the correction RS may be mapped as in FIG. 3A when the number of multiplexed layers configured to user terminal 20 is small, and the correction RS may not be mapped as in FIG. 3B when the number of multiplexed layers is large. For example, when the correction RS is defined for each layer, the overhead of the correction RS increases with an increase in the number of multiplexed layers. Therefore, the correction RS is not mapped when the number of multiplexed layers is large, and this can reduce the overhead and prevent the reduction in the throughput.

(3) The Number of Assigned Resources

The correction RS may be mapped as in FIG. 3A when the number of resources (for example, the number of RUs or the number of RBs) assigned to user terminal 20 is large (for example, when the number of assigned resources is equal to or greater than a threshold), and the correction RS may not be mapped as in FIG. 3B when the number of assigned resources is small (for example, when the number of assigned resources is smaller than the threshold).

The smaller the number of assigned resources, the larger the ratio of the correction RS to the entire assigned resources. Therefore, when the number of assigned resources is small, the method of prioritizing the reduction in the overhead resulting from not mapping the correction RS can be used to prevent the reduction in the throughput in user terminal 20.

(4) Carrier Frequency

The correction RS may be mapped as in FIG. 3A when the carrier frequency configured to user terminal 20 is high (for example, when the carrier frequency is equal to or greater than a threshold), and the correction RS may not be mapped as in FIG. 3B when the carrier frequency is low (for example, when the carrier frequency is smaller than the threshold).

When the carrier frequency is the influence of the phase variation is smaller than when the carrier frequency is high. Therefore, when the carrier frequency is low, user terminal 20 can obtain sufficient channel estimation accuracy based on the demodulation RS without correcting the phase variation based on the correction RS. Since the correction RS is not mapped as in FIG. 3B when the carrier frequency is low, user terminal 20 can receive a more DL data signal to reduce the overhead of the correction RS and improve the throughput. Therefore, when the carrier frequency configured to user terminal 20 is low, user terminal 20 can reduce the overhead of the correction RS and improve the throughput while securing the channel estimation accuracy.

On the other hand, when the carrier frequency configured to user terminal 20 is high, user terminal 20 can improve the channel estimation accuracy based on the method of correcting the phase variation using the correction RS as shown in FIG. 3A.

(5) Category of User Terminal 20

Each user terminal 20 is sorted into a category (UE category) according to the performance (such as communication speed and corresponding communication bandwidth) of each user terminal 20.

The correction RS may be mapped as in FIG. 3A when the category of user terminal 20 is a category indicating a high performance, and the correction RS may not be mapped as in FIG. 3B when the category indicates a low performance.

For example, radio base station 10 and user terminal 20 can hold in advance the association between the category of user terminal 20 and whether to map the correction RS, and mapping of each user terminal 20 can be configured based on the association.

User terminal 20 in the category indicating a high performance is assumed to include a high-performance receiver. Therefore, user terminal 20 in the category indicating a high performance can obtain sufficient channel estimation accuracy based on the demodulation RS without correcting the phase variation based on the correction RS. Since the correction RS is not mapped as in FIG. 3B, user terminal 20 in the category indicating a high performance can receive a more DL data signal to reduce the overhead of the correction RS and improve the throughput. Therefore, user terminal 20 in the category indicating a high performance can reduce the overhead of the correction RS and improve the throughput while securing the channel estimation accuracy.

On the other hand, when the category indicates a low performance, the performance of the receiver of user terminal 20 is assumed to be low. Therefore, user terminal 20 in the category indicating a low performance can improve the channel estimation accuracy based on the method of correcting the phase variation using the correction RS as shown in FIG. 3A.

Alternatively, the correction RS may not be mapped as shown in FIG. 3B when the category of user terminal 20 is a category in which narrow-band communication is expected (for example, category M1, 0, or NB1), and the correction RS may be mapped as in FIG. 3A when the category of user terminal 20 is a category other than the category in which narrow-band communication is expected.

When narrow-band communication is expected in the category, such as in categories M1, 0, and NB1, the ratio of the correction RS to the entire resources in the narrow band that can be used by user terminal 20 is large. Therefore, when narrow-band communication is expected in the category, such as in categories M1, 0, and NB1, the reduction in the throughput of user terminal 20 can be prevented based on the method of prioritizing the reduction in the overhead resulting from not mapping the correction RS.

(6) Mobile Speed of User Terminal 20

For example, the correction RS may be mapped as in FIG. 3A when the mobile speed of user terminal 20 is high (for example, when the mobile speed is equal to or greater than a threshold value), and the correction RS may not be mapped as in FIG. 3B when the mobile speed of user terminal 20 is low (for example, when the mobile speed is smaller than the threshold).

The phase variation is small in user terminal 20 during low-speed movement, and user terminal 20 can obtain sufficient channel estimation accuracy due to the demodulation RS without correcting the phase variation based on the correction RS. Since the correction RS is not mapped as in FIG. 3B, user terminal 20 during low-speed movement can receive a more DL data signal to reduce the overhead of the correction RS and improve the throughput. Therefore, user terminal 20 during low-speed movement can reduce the overhead of the correction RS and improve the throughput while securing the channel estimation accuracy.

On the other hand, the phase variation is expected to be intense in user terminal 20 during high-speed movement. Therefore, user terminal 20 during high-speed movement can improve the channel estimation accuracy based on the method of using the correction RS to correct the phase variation as shown in FIG. 3A.

Note that radio base station 10 and user terminal 20 may specify the mobile speed of user terminal 20 according to, for example, an index (for example, high speed flag) indicating the movement state (high-speed movement or low-speed movement) of user terminal 20. When information similar to the mobile speed can be explicitly or implicitly obtained in communication of an earlier stage of data signal transmission, such as in initial access, radio base station 10 and user terminal 20 may specify the mobile speed according to the information.

(7) Capability of Radio Base Station 10

For example, the correction RS may be mapped as in FIG. 3A when radio base station 10 connected with user terminal 20 is a small cell, and the correction RS may not be mapped as in FIG. 3B when radio base station 10 connected with user terminal 20 is a macro cell.

The processing capability (for example, performance of RF circuit) of radio base station 10 that is a macro cell is assumed to be higher than the processing capability of the small cell. Therefore, user terminal 20 connected to the macro cell can use, for example, the demodulation RS of a highly accurate signal transmitted from the macro cell to obtain sufficient channel estimation accuracy. Since the correction RS is not mapped as in FIG. 3B, user terminal 20 connected to the macro cell can receive a more DL data signal to reduce the overhead of the correction RS and improve the throughput. Therefore, user terminal 20 connected to the macro cell can reduce the overhead of the correction RS and improve the throughput while securing the channel estimation accuracy.

On the other hand, the configuration of the small cell is assumed to be simpler than the configuration of the macro cell, and the processing capability (for example, performance of RF circuit) of radio base station 10 is assumed to be low. Therefore, user terminal 20 connected to the small cell may not be able to obtain sufficient channel estimation accuracy even if the demodulation RS transmitted from the small cell is used. Thus, user terminal 20 connected to the small cell can improve the channel estimation accuracy based on the method of correcting the phase variation using the correction RS as shown in FIG. 3A.

This completes the description of the examples of the parameters configured to user terminal 20 for deciding the mapping configuration of the correction RS.

Note that the parameters related to user terminal 20 serving as determination criteria for deciding whether to map the correction RS are not limited to parameters (1) to (7), and the parameters may be other parameters (for example, parameters affecting the throughput (channel estimation accuracy or overhead) of user terminal 20).

Furthermore, whether to map the correction RS may be decided according to a combination of a plurality of parameters instead of deciding whether to map the correction RS according to one of parameters (1) to (7). Specifically, indices may be associated with possible patterns of the combinations of a plurality of parameters among parameters (1) to (7) (or other parameters), and radio base station 10 and user terminal 20 may decide the mapping configuration of the correction RS according to the index corresponding to the combination of actual values of a plurality of parameters configured to user terminal 20.

For example, combinations of the modulation scheme (MCS index) and the carrier frequency and whether to map the correction RS (on/off) may be associated. More specifically, whether to map the correction RS is associated with each of combinations of a plurality of candidates for the configuration of the modulation scheme and a plurality of candidates for the configuration of the carrier frequency. In this case, user terminal 20 can determine whether the correction RS is mapped or not based on the index associated with the combination of the modulation scheme and the carrier frequency configured to user terminal 20. Whether the correction RS is mapped may be determined by a combination of other parameters instead of the combination of the modulation scheme and the carrier frequency or may be determined by a combination of three or more parameters.

Advantageous Effects of Present Embodiment

In this way, radio base station 10 determines whether to transmit the correction RS to user terminal 20 according to the parameters configured to user terminal 20 in the present embodiment. In user terminal 20, reception section 202 and signal separation section 204 receive the DL data signal and the demodulation RS mapped to the downlink resources, and demodulation and decoding section 208 demodulates the DL data signal using the demodulation RS. In the downlink resources, the correction RS is mapped according to the parameters related to user terminal 20 signaled to user terminal 20. Reception section 202 and signal separation section 204 specify the mapping pattern of the correction RS (whether to map the correction RS) based on the parameters, and demodulation and decoding section 208 demodulates the DL data signal using the correction RS.

In this way, the mapping configuration of the correction RS is decided according to user terminal 20 to reduce the deterioration of the channel estimation accuracy caused by the phase variation while reducing the increase in the overhead caused by the correction RS. The processing can prevent the reduction in the throughput in user terminal 20 caused by the overhead of the correction RS while reducing the deterioration of the channel estimation accuracy. Therefore, according to the present embodiment, the correction RS can be efficiently mapped according to the state of user terminal 20 when the demodulation RS is mapped on the forward side of the subframe.

In the present embodiment, user terminal 20 determines the mapping configuration of the correction RS according to the parameters configured to user terminal 20. Therefore, user terminal 20 is implicitly notified of the mapping configuration of the correction RS through signaling of other parameters. As a result of the processing, additional signaling for notifying the mapping configuration of the correction RS is not necessary.

Embodiment 2

When the demodulation RS is mapped on the forward side of the subframe in a radio communication system of the future, a demodulation RS (additional DMRS, hereinafter referred to as "additional demodulation RS") besides the demodulation RS mapped on the forward side of the subframe can be added to secure the channel estimation accuracy during high-speed movement of the user terminal.

More specifically, when the demodulation RS is mapped on the forward side of the subframe, the correction RS described in Embodiment 1 and the additional demodulation RS may be mapped.

However, when both of the correction RS and the additional demodulation RS are mapped, the ratio of the reference signal to the entire radio resources becomes high, and the resources for mapping the DL data signal are reduced. There is a problem in that the throughput is reduced.

To resolve the problem, the present inventors have conceived to control the mapping (placement) of the correction RS according to the configuration of the additional demodulation RS and have made the present invention.

Basic configurations of a radio base station and a user terminal according to the present embodiment are the same as the basic configurations of radio base station 10 and user terminal 20 according to Embodiment 1, and the radio base station and the user terminal will be described with reference to FIGS. 1 and 2.

Hereinafter, operation of radio base station 10 and user terminal 20 according to the present embodiment will be described in detail.

In the present embodiment, radio base station 10 decides whether to map the correction RS (on/off configuration of correction RS) according to the configuration of the additional demodulation RS for user terminal 20. User terminal 20 determines whether the correction RS is mapped according to the configuration of the additional demodulation RS for user terminal 20.

Specifically, the correction RS is not mapped in the subframe in which the additional demodulation RS is mapped, and the correction RS is mapped in the subframe in which the additional demodulation RS is not mapped.

Figure 4B:
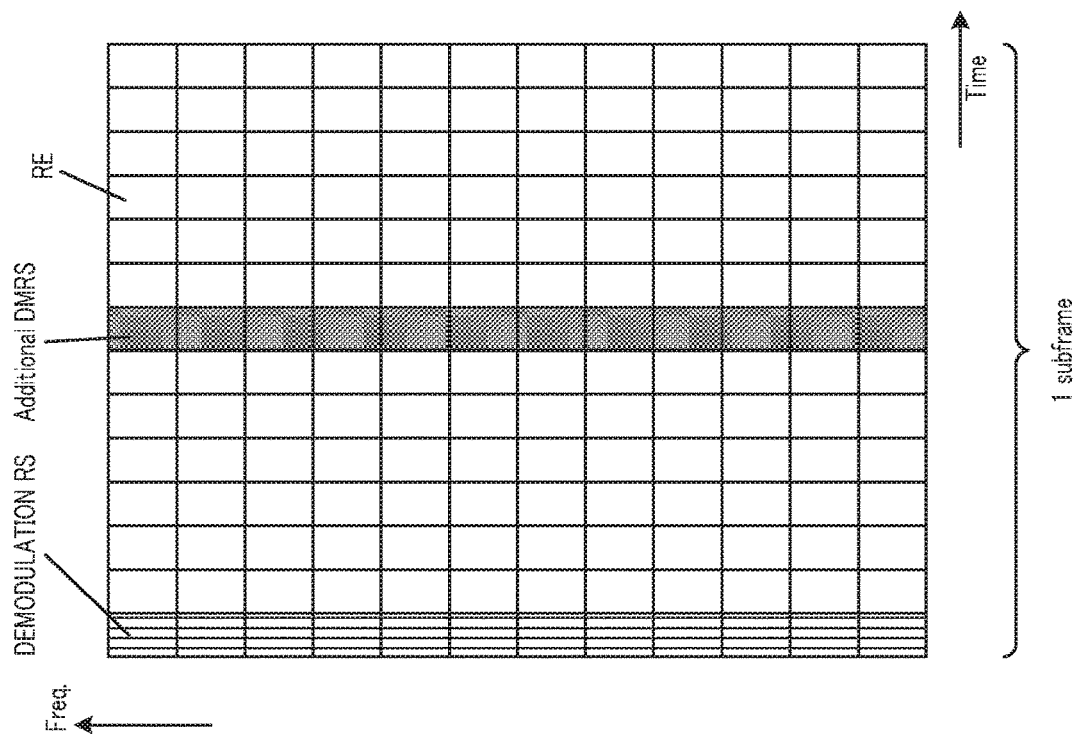
FIG. 4B illustrates a mapping example when the correction RS is not transmitted according to Embodiment 2.
Figure 4A:
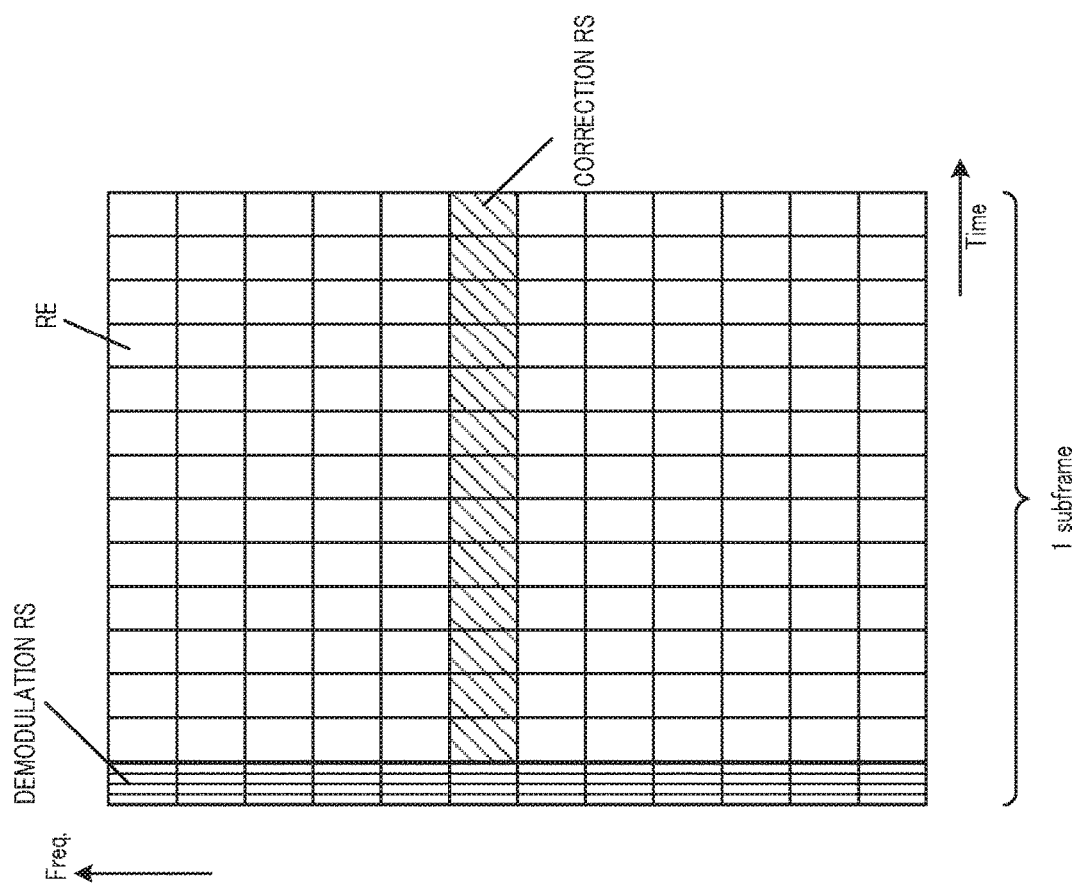
FIG. 4A illustrates a mapping example when the correction RS is transmitted according to Embodiment 2.

FIGS. 4A and 4B illustrate mapping examples of the demodulation RS, the correction RS, and the additional demodulation RS (additional DMRS) according to the present embodiment. FIG. 4A illustrates an example in which the correction RS is mapped, and FIG. 4B illustrates an example in which the additional demodulation RS is mapped. Note that the additional demodulation RS may be, for example, a reference signal (UE specific RS) specific to each user terminal 20.

In FIGS. 4A and 4B, the resource unit (RU) is defined by 168 REs constituted by 14 symbols and 12 subcarriers as in FIGS. 3A and 3B. In FIGS. 4A and 4B, 1 subframe is constituted by 14 symbols. In FIGS. 4A and 4B, only the demodulation RS, the correction RS, and the additional demodulation RS are illustrated, and the DL data signal mapped in the subframe is not illustrated. As shown in FIGS. 4A and 4B, the demodulation RS is mapped to the first symbol (top symbol) of the subframe in the frequency direction.

As shown in FIG. 4A, the correction RS is mapped in the subframe in which the additional demodulation RS is not wrapped for user terminal 20. Note that the correction RS is mapped to the second and subsequent symbols of the subframe in the example of FIG. 4A. User terminal 20 can improve the channel estimation accuracy by correcting the phase variation using the correction RS shown in FIG. 4A.

As shown in FIG. 4B, the correction RS is not mapped in the subframe in which the additional demodulation RS is mapped for user terminal 20. In FIG. 4B, user terminal 20 uses the demodulation RS and the additional demodulation RS to compute the channel estimation value. The processing can follow the channel variation during high-speed movement, and the channel estimation accuracy can be improved.

Therefore, as shown in FIGS. 4A and 4B, the correction RS for correcting the phase variation and the additional demodulation RS are not mapped at the same time in each subframe, and one of the correction RS and the additional demodulation RS is mapped. According to the processing, the increase in the ratio of the reference signal (demodulation RS, correction RS, or additional demodulation RS) to the entire resources, that is, the increase in the overhead, can be prevented, and the reduction in the throughput can be prevented.

In the present embodiment, user terminal 20 determines whether the correction RS is mapped or not according to the configuration of the additional demodulation RS for user terminal 20. More specifically, user terminal 20 is implicitly notified of the mapping configuration of the correction RS through signaling of other parameters (additional demodulation RS). As a result of the processing, additional signaling for notifying the mapping configuration of the correction RS is not necessary.

Note that the configuration of the additional demodulation RS is indicated from radio base station 10 to user terminal 20 through signaling. Therefore, it can be stated that the configuration of the additional demodulation RS is one of the parameters (for example, may be handled as parameter (8)) configured to user terminal 20 as described in Embodiment 1. For example, in the present embodiment, the configuration of the additional demodulation RS and at least one of the parameters (for example, (1) to (7)) configured to user terminal 20 described in Embodiment 1 may be combined to decide the mapping configuration of the correction RS according to the combination.

For example, radio base station 10 and user terminal 20 may determine that the correction RS is not mapped as described above in the subframe in which the additional demodulation RS is configured. In the subframe in which the additional demodulation RS is not configured, radio base station 10 and user terminal 20 may determine whether the correction RS is mapped according to the parameters related to user terminal 20 as described in Embodiment 1.

One of the correction RS and the additional demodulation RS is configured in each subframe in the case described in the present embodiment. However, there can be a subframe in which both of the correction RS and the additional demodulation RS are mapped depending on the communication environment of user terminal 20, instead of configuring one of the correction RS and the additional demodulation RS. For example, when user terminal 20 is moving at a high speed, both of the correction RS and the additional demodulation RS may be used to improve the channel estimation accuracy while correcting the phase variation.

When the additional demodulation RS is configured to user terminal 20, whether to map the correction RS may be decided according to the pattern of the additional demodulation RS, instead of not mapping the correction RS all the time. For example, the correction RS may be mapped in the subframe with a relatively small number of REs (density) provided with the additional demodulation RS and/or in the subframe with a relatively small number of insertions of the additional demodulation RS in the time direction. In other words, the correction RS may be mapped when the degree of increase in the ratio of the reference signal to the entire resources caused by mapping of the additional demodulation RS is small and/or when the effect of correcting the phase variation is assumed to be small. The processing can correct the phase variation to improve the channel estimation accuracy while preventing the increase in the overhead.

Embodiment 3

In the present embodiment, the correction RS is a UE specific RS specific to the user terminal. In this case, if the correction RS is mapped at certain intervals in the frequency direction, the resource size may be smaller than the mapping intervals of the correction RS depending on the resource assignment to the user terminal, and the correction RS may not be mapped in the assigned resources. In this case, the user terminal cannot correct the phase variation caused by the correction RS, and there is a problem in that the channel estimation accuracy is deteriorated.

To resolve the problem, the present inventors have conceived to control the mapping (placement) of the correction RS according to the assigned resources of the user terminal and have made the present invention.

Basic configurations of a radio base station and a user terminal according to the present embodiment are the same as the basic configurations of radio base station 10 and user terminal 20 according to Embodiment 1, and the radio base station and the user terminal will be described with reference to FIGS. 1 and 2.

Hereinafter, operation of radio base station 10 and user terminal 20 according to the present embodiment will be described in detail.

In the present embodiment, radio base station 10 decides the position for mapping the correction RS in the frequency direction or the density of the correction RS in the frequency direction according to the parameters (resources or the like) configured to user terminal 20. User terminal 20 specifies the position of the correction RS mapped in the frequency direction or the density of the correction RS in the frequency direction according to the parameters (resources or the like) configured to user terminal 20. Therefore, radio base station 10 and user terminal 20 configure the mapping pattern (mapping position, density, or the like) of the correction RS for user terminal 20 according to the parameters configured to user terminal 20.

Figure 5C:
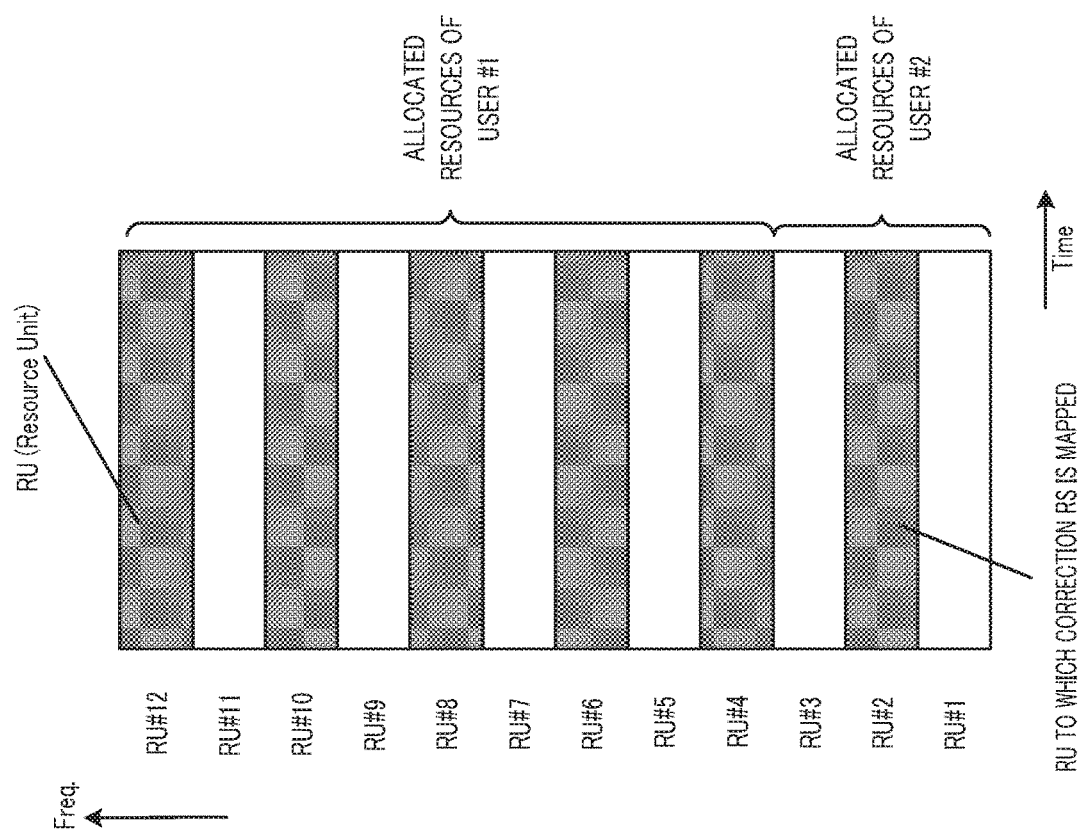
FIG. 5C illustrates a mapping example of the correction RS according to Embodiment 3.

FIGS. 5A, 5B and 5C illustrate examples of resource units (RU #1 to RU #12) in the frequency direction. For example, in FIGS. 5A, 5B and 5C, the RUs provided with the correction RS correspond to the mapping configuration shown in FIG. 3A, and the RUs other than the RUs provided with the correction RS correspond to the mapping configuration shown in FIG. 3B.

In FIGS. 5A, 5B and 5C, eight RUs of RU #4 to RU #12 are assigned to user #1, and three RUs of RU #1 to RU #3 are assigned to user #2.

As shown in FIGS. 5A, 5B and 5C, at least one correction RS is mapped in the resources assigned to each user terminal 20 (users #1 and #2).

Specifically, the correction RS is mapped in one RU for user #1 and user #2 in FIG. 5A. In FIG. 5A, the correction RS is mapped in RU #8 at the center of the assigned resources (RU #4 to RU #12) of user #1 and in RU #2 at the center of the assigned resources (RU 41 to RU #3) of user #2.

For example, the signal is easily distorted in the resources equivalent to the edges of the system band. Therefore, the mapping position of the correction RS in the resources assigned to each user terminal 20 is set to the center of the resources to avoid mapping at the edges of the system band and prevent the distortion of the correction RS. When the correlation of the time variation of the channel decreases with an increase in the distance to the subcarrier, the correction RS can be set to the center of the resources to reduce errors during correction.

In FIG. 5B, the correction RS is mapped in two RUs for user #1 and user #2. In FIG. 5B, the correction RS is snapped in RU #6 and RU #10 among the assigned resources (RU #4 to RU #12) of user #1 and in RU #1 and RU #3 among the assigned resources (RU #1 to RU #3) of user #2. As a result of the processing, each user terminal 20 can execute interpolation processing by using a plurality of received correction RSs to also correct the channel estimation values for the resources in which the correction RS is not mapped. The channel estimation accuracy can be improved more than in the case of FIG. 5A.

In FIG. 5C, the correction RS is mapped in five RUs for user #1, and the correction RS is mapped in one RU for user #2. In FIG. 5C, the correction RS is mapped in RU #4, RU #6, RU #8, RU #10, and RU #12 among the assigned resources (RU #4 to RU #12) of user #1 and in RU #2 among the assigned resources (RU #1 to RU #3) of user #2. In this way, for example, the number of correction RSs to be mapped can be adjusted according to the size of the resources assigned to user terminal 20 to realize required channel estimation accuracy while preventing the increase in the overhead of the correction RS.

Note that the number of correction RSs in the resources assigned to each user terminal 20 is not limited to one or two, and the number of correction RSs may be three or more. The mapping positions of the correction RSs in the resources assigned to each user terminal 20 are not limited to the examples illustrated in FIGS. 5A to 5C, and the correction RSs may be mapped at equal intervals in the resources. The correction RSs may be distributedly mapped or may be localizedly mapped. For example, the correction RSs may be mapped in the RUs closer to the center frequency of the system band in the resources. The processing can avoid mapping at the edges of the system band and prevent distortion of the correction RSs as in FIG. 5A. Alternatively, the correction RSs may be mapped in the RUs at both edges (or near both edges) in the resources. As a result of the processing, user terminal 20 can use the correction RSs to execute interpolation processing for the RUs between the RUs in which the correction RSs are mapped. This can improve the channel estimation accuracy.

In the present embodiment, the density of the RUs provided with the correction RSs in the resources assigned to user terminal 20 may be set according to the parameters (for example, parameters (1) to (7) described in Embodiment 1) related to user terminal 20. When the number of RUs to be provided with the correction RSs is designated, the number of correction RSs per user becomes constant regardless of the size of the assigned resources, and the required channel estimation accuracy of the correction RSs can be realized. On the other hand, when the density of the RUs to be provided with the correction RSs is designated, the size of the overhead of the correction RSs can be constant regardless of the size of the assigned resources.

Examples of the parameters related to user terminal 20 for configuring the density of the correction RS in the resources assigned to user terminal 20 include the following parameters.

(1) Modulation Scheme or MCS Index

The density of the correction RS in the assigned resources of user terminal 20 may be increased (the number of correction RSs may be increased) as shown in FIG. 5B when the modulation scheme configured to user terminal 20 is high (for example, when the modulation level is equal to or greater than a threshold), and the density of the correction RS in the assigned resources of user terminal 20 may be reduced (the number of correction RSs may be reduced) as shown in FIG. 5A when the modulation scheme is low (for example, when the modulation level is smaller than the threshold). As described above, the modulation scheme or the MCS index may be indicated from radio base station 10 to user terminal 20 or may be configured by user terminal 20.

Note that there can be a plurality of candidates for the density of the correction RS in the assigned resources of user terminal 20. For example, the modulation levels of the modulation scheme may be sorted into a plurality of groups in ascending order or descending order, and a higher density of correction RS may be configured for a higher modulation scheme. For example, focusing on user #1 of FIGS. 5A, 5B, and 5C, when the modulation schemes are sorted into three groups, the mapping pattern shown in FIG. 5A (mapped in one RU) may be configured in the group with the lowest modulation scheme. The mapping pattern shown in FIG. 5B (mapped in two RUs) may be configured in the group with the second lowest modulation scheme, and the mapping pattern shown in FIG. 5C (mapped in five RUs) may be configured in the group with the highest modulation scheme.

Therefore, the density of the correction RS in the assigned resources of each user terminal 20 is configured according to the modulation scheme configured to each user terminal 20.

When the modulation scheme is low (such as BPSK and QPSK), the influence of the phase variation on the constellation where signal points are placed is smaller than when the modulation scheme is high (such as 16 QAM, 64 QAM, and 256 QAM). Therefore, when the modulation scheme is low, user terminal 20 can obtain sufficient channel estimation accuracy based on the demodulation RS without correcting the phase variation based on the correction RS. More specifically, the density of the correction RS is low when the modulation scheme is low, and user terminal 20 can receive a more DL data signal to reduce the overhead of the correction RS and improve the throughput. Therefore, when the modulation scheme is low, user terminal 20 can reduce the overhead of the correction RS and improve the throughput while securing the channel estimation accuracy.

On the other hand, when the modulation scheme configured to user terminal 20 is high, user terminal 20 can improve the channel estimation accuracy based on the processing of correcting the phase variation using the correction RS mapped at a high density.

Note that when multi-layer transmission is performed for user terminal 20, the mapping configuration (density configuration) of the correction RS may be commonly configured for a plurality of layers or may be specifically configured for each layer.

For example, the density of the correction RS based on the lowest modulation scheme (or MCS index) among the plurality of layers may be commonly configured for the plurality of layers. The processing can reduce the overhead caused by the correction RS in the entire layers. Alternatively, the density of the correction RS based on the highest modulation scheme (or MCS index) among the plurality of layers may be commonly configured for the plurality of layers. The processing can obtain sufficient channel estimation accuracy in all of the layers, and user terminal 20 can normally demodulate the DL data signal.

Alternatively, the density of the correction RS may be configured for each of a plurality of layers according to the modulation scheme configured for each of the plurality of layers. The processing can reduce the overhead of the correction RS while securing the channel estimation accuracy required in each of the plurality of layers.

(2) The Number of Multiplexed Layers

The density of the correction RS in the assigned resources of user terminal 20 may be increased as in FIG. 5B when the number of multiplexed layers configured to user terminal 20 is large (for example, when the number of multiplexed layers is equal to or greater than a threshold), and the density of the correction RS in the assigned resources of user terminal 20 may be reduced as in FIG. 5A when the number of multiplexed layers is low (for example, when the number of multiplexed layers is smaller than the threshold).

The larger the number of multiplexed layers, the higher the required channel estimation accuracy. Therefore, user terminal 20 can improve the channel estimation accuracy based on the processing of correcting the phase variation using the correction RS mapped at a high density. On the other hand, the smaller the number of multiplexed layers, the lower the required channel estimation accuracy. Sufficient channel estimation accuracy can be obtained based on the demodulation RS. Since the density of the correction RS is low, user terminal 20 can receive a more DL data signal, and the throughput can be improved while the required channel estimation accuracy is secured.

Alternatively, the density of the correction RS in the assigned resources of user terminal 20 may be increased as in FIG. 5B when the number of multiplexed layers configured to user terminal 20 is small, and the density of the correction RS in the assigned resources of user terminal 20 may be reduced as in FIG. 5A when the number of multiplexed layers is large. For example, when the correction RS is defined for each layer, the overhead of the correction RS increases with an increase in the number of multiplexed layers. Therefore, the density of the correction RS is reduced when the number of multiplexed layers is large, and this can reduce the overhead and prevent the reduction in the throughput.

(3) The Number of Assigned Resources

The density of the correction RS in the assigned resources of user terminal 20 may be increased when the number of resources (resource size such as the number of RUs and the number of RBs) assigned to user terminal 20 is large (for example, when the number of assigned resources is equal to or greater than a threshold), and the density of the correction RS in the assigned resources of user terminal 20 may be reduced when the number of resources assigned to user terminal 20 is small (for example, when the number of assigned resources is smaller than the threshold).

The smaller the number of assigned resources, the larger the ratio of the correction RS to the entire assigned resources. Therefore, when the number of assigned resources is small, the reduction in the overhead can be prioritized based on the method of reducing the density of the correction RS, and the reduction in the throughput of user terminal 20 can be prevented.

(4) Carrier Frequency

The density of the correction RS in the assigned resources of user terminal 20 may be increased as in FIG. 5B when the carrier frequency configured to user terminal 20 is high (for example, when the carrier frequency is equal to or greater than a threshold), and the density of the correction RS in the assigned resources of user terminal 20 may be reduced as in FIG. 5A when the carrier frequency is low (for example, when the carrier frequency is smaller than the threshold).

When the carrier frequency is low, the influence of the phase variation is smaller than when the carrier frequency is high. Therefore, when the carrier frequency is low, user terminal 20 can obtain sufficient channel estimation value without correcting the phase variation based on the correction RS. Since the density of the correction RS is low when the carrier frequency is low, user terminal 20 can receive a more DL data signal to reduce the overhead of the correction RS and improve the throughput. Therefore, when the carrier frequency configured to user terminal 20 is low, user terminal 20 can reduce the overhead of the correction RS and improve the throughput while securing the channel estimation accuracy.

On the other hand, when the carrier frequency configured to user terminal 20 is high, user terminal 20 can improve the channel estimation accuracy based on the processing of correcting the phase variation using the correction RS mapped at a high density.

(5) Category of User Terminal 20

The density of the correction RS in the assigned resources of user terminal 20 may be reduced as in FIG. 5A when the category of user terminal 20 is a category indicating a high performance, and the density of the correction RS in the assigned resources of user terminal 20 may be increased as in FIG. 5B when the category indicates a low performance.

User terminal 20 in the category indicating a high performance is assumed to include a high-performance receiver. Therefore, user terminal 20 in the category indicating a high performance can obtain sufficient channel estimation accuracy based on the demodulation RS without correcting the phase variation based on the correction RS. Since the correction RS is configured at a low density, user terminal 20 in the category indicating a high performance can receive a more DL data signal to reduce the overhead of the correction RS and improve the throughput. Therefore, user terminal 20 in the category indicating a high performance can reduce the overhead of the correction RS and improve the throughput while securing the channel estimation accuracy.

On the other hand, when the category indicates a low performance, the performance of the receiver of user terminal 20 is assumed to be low. Therefore, user terminal 20 in the category indicating a low performance can improve the channel estimation accuracy based on the processing of correcting the phase variation using the correction RS mapped at a high density.

Alternatively, the density of the correction RS in the assigned resources of user terminal 20 may be reduced as shown in FIG. 5A when the category of user terminal 20 is a category in which narrow-band communication is expected (for example, category M1, category 0, or category NB1), and the density of the correction RS in the assigned resources of user terminal 20 may be increased as in FIG. 5B when the category of user terminal 20 is a category other than the category in which narrow-band communication is expected.

When narrow-band communication is expected in the category, such as in categories M1, 0, and NB1, the ratio of the correction RS to the entire resources in the narrow band that can be used by user terminal 20 is large. Therefore, when narrow-band communication is expected in the category, such as in categories M1, 0, and NB1, the method of reducing the density of the correction RS can be used to prioritize the reduction in the overhead, and the reduction in the throughput of user terminal 20 can be prevented.

(6) Mobile Speed of User Terminal 20

For example, the density of the correction RS in the assigned resources of user terminal 20 may be increased as in FIG. 5B when the mobile speed of user terminal 20 is high (for example, when the mobile speed is equal to or greater than a threshold value), and the density of the correction RS in the assigned resources of user terminal 20 may be reduced as in FIG. 5A when the mobile speed of user terminal 20 is low (for example, when the mobile speed is smaller than the threshold).

The phase variation is small in user terminal 20 during low-speed movement, and user terminal 20 can obtain sufficient channel estimation accuracy due to the demodulation RS without correcting the phase variation based on the correction RS. Since the correction RS is configured at a low density, user terminal 20 during low-speed movement can receive a more DL data signal to reduce the overhead of the correction RS and improve the throughput. Therefore, user terminal 20 during low-speed movement can reduce the overhead of the correction RS and improve the throughput while securing the channel estimation accuracy.

On the other hand, the phase variation is expected to be intense in user terminal 20 during high-speed movement. Therefore, user terminal 20 during high-speed movement can improve the channel estimation accuracy based on the processing of correcting the phase variation using the correction RS mapped at a high density.

Note that radio base station 10 and user terminal 20 may specify the mobile speed of user terminal 20 according to, for example, an index (for example, high speed flag) indicating the movement state (high-speed movement or constant-speed movement) of user terminal 20. When information similar to the mobile speed can be explicitly or implicitly obtained in communication of an earlier stage of data signal transmission, such as in initial access, radio base station 10 and user terminal 20 may specify the mobile speed according to the information.

(7) Capability of Radio Base Station 10

For example, the density of the correction RS in the assigned resources of user terminal 20 may be increased as in FIG. 5B when radio base station 10 connected with user terminal 20 is a small cell, and the density of the correction RS in the assigned resources of user terminal 20 may be reduced as in FIG. 5A when radio base station 10 connected with user terminal 20 is a macro cell.

The processing capability (for example, performance of RF circuit) of radio base station 10 that is a macro cell is assumed to be higher than the processing capability of the small cell. Therefore, user terminal 20 connected to the macro cell can use, for example, a highly accurate demodulation RS transmitted from the macro cell to obtain sufficient channel estimation accuracy. Since the correction RS is configured at a low density, user terminal 20 connected to the macro cell can receive a more DL data signal to reduce the overhead of the correction RS and improve the throughput. Therefore, user terminal 20 connected to the macro cell can reduce the overhead of the correction RS and improve the throughput while securing the channel estimation accuracy.

On the other hand, the configuration of the small cell is assumed to be simpler than the configuration of the macro cell, and the processing capability (for example, performance of RF circuit) of radio base station 10 is assumed to be low. Therefore, user terminal 20 connected to the small cell may not be able to obtain sufficient channel estimation accuracy even if the demodulation RS transmitted from the small cell is used. Thus, user terminal 20 connected to the small cell can improve the channel estimation accuracy based on the processing of correcting the phase variation using the correction RS mapped at a high density.

This completes the description of the examples of the parameters set to user terminal 20 for deciding the mapping configuration (density configuration) of the correction RS.

Note that the parameters related to user terminal 20 serving as determination criteria for deciding the density of the correction RS in the assigned resources of user terminal 20 are not limited to parameters (1) to (7), and the parameters may be other parameters (for example, parameters affecting the throughput (channel estimation accuracy or overhead) of user terminal 20). For example, the density of the correction RS may be reduced in the subframes provided with the additional demodulation RS (Additional DMRS) described in Embodiment 2, and the density of the correction RS may be increased in the subframes not provided with the additional demodulation RS.

Furthermore, the density of the correction RS in the assigned resources of user terminal 20 may be decided according to a combination of a plurality of parameters instead of deciding the density of the correction RS according to one of parameters (1) to (7) or according to the configuration of the additional demodulation RS (for example, referred to as parameter (8)). Specifically, indices may be associated with possible patterns of the combinations of a plurality of parameters among parameters (1) to (8) (or other parameters), and radio base station 10 and user terminal 20 may decide the mapping configuration of the correction RS according to the index corresponding to the combination of actual values of a plurality of parameters set to user terminal 20.

Advantageous Effects of Present Embodiment

In way, radio base station 10 determines the mapping configuration (mapping position or density) of the correction RS in the resources assigned to user terminal 20 according to the parameters configured to user terminal 20 in the present embodiment. User terminal 20 specifies the mapping configuration of the correction RS in the resources assigned to user terminal 20 according to the parameters configured to user terminal 20. In this case, at least one correction RS is mapped in the resources assigned to each user terminal 20. The density of the correction RS mapped in the resources assigned to user terminal 20 is configured according to the parameters signaled to user terminal 20.

In this way, the mapping configuration of the correction RS is decided in each user terminal 20 to reduce the deterioration of the channel estimation accuracy caused by the phase variation while reducing the increase in the overhead caused by the correction RS. The processing can prevent the reduction in the throughput in user terminal 20 caused by the overhead of the correction RS while reducing the deterioration of the channel estimation accuracy. Therefore, according to the present embodiment, the correction RS can be efficiently mapped in each user terminal when the demodulation RS is to be mapped on the forward side of the subframes.

In the present embodiment, user terminal 20 determines the mapping configuration (mapping position or density) of the correction RS according to the parameters configured to user terminal 20. Therefore, user terminal 20 is implicitly notified of the mapping configuration of the correction RS through signaling of other parameters. As a result of the processing, additional signaling for notifying the mapping configuration of the correction RS is not necessary.

This completes the description of embodiments.

Note that when MU-MIMO (Multi User MIMO) multiplexing is applied in the description, the mapping configuration (whether to map, mapping position, density, and the like) of the correction RS may be a different configuration in each of multiplexed user terminals 20 or may be a common configuration for multiplexed user terminals 20.

In the description, 1 RU is defined by 168 REs constituted by 14 symbols and 12 subcarriers. However, the definition of RU (the number of symbols and the number of subcarriers) is not particularly limited in the present embodiment.

Furthermore, the sequence generation procedure of the correction RS is also not particularly limited in the present embodiment. For example, a PN (Pseudo Noise) sequence may be generated from sequence seeds including one or a combination of a plurality of PCID (Physical Cell Identities), VCID (Virtual Cell Identities), and UE-ID (User Equipment Cell Identities), and the PN sequence may be used to generate the correction RS. Alternatively, another sequence, such as a Zadoff-Chu sequence, may be used instead of the PN sequence to generate the correction RS.

Figure 7:
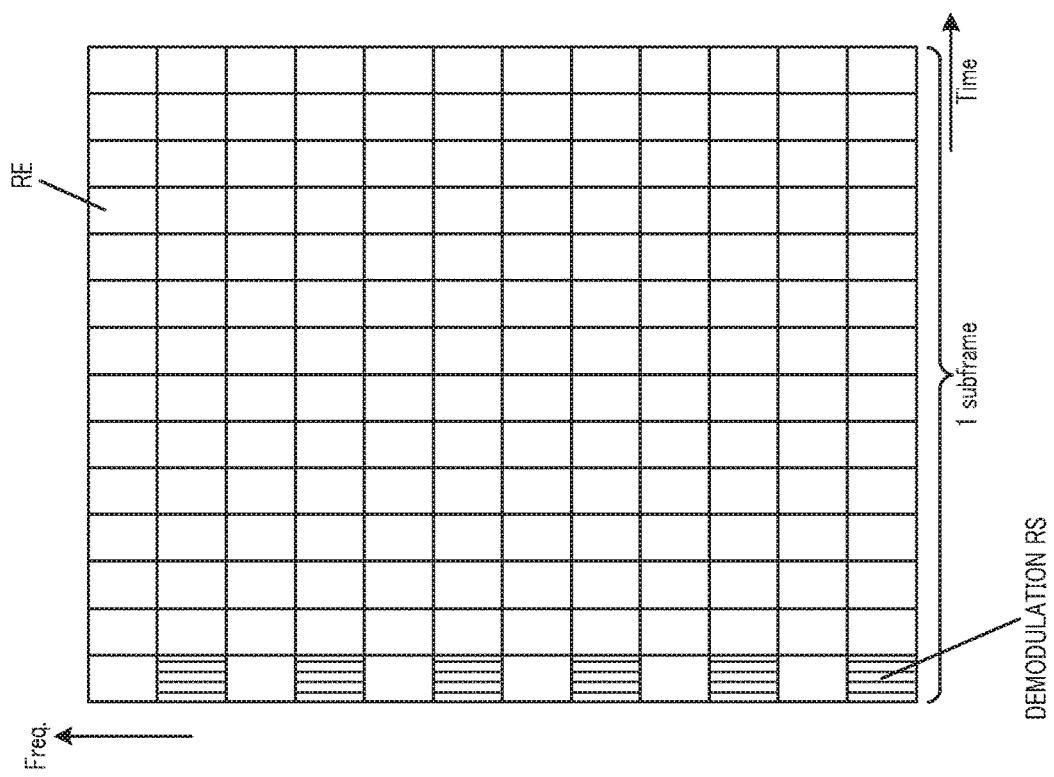
FIG. 7 illustrates a second mapping example of the demodulation RS.
Figure 6:
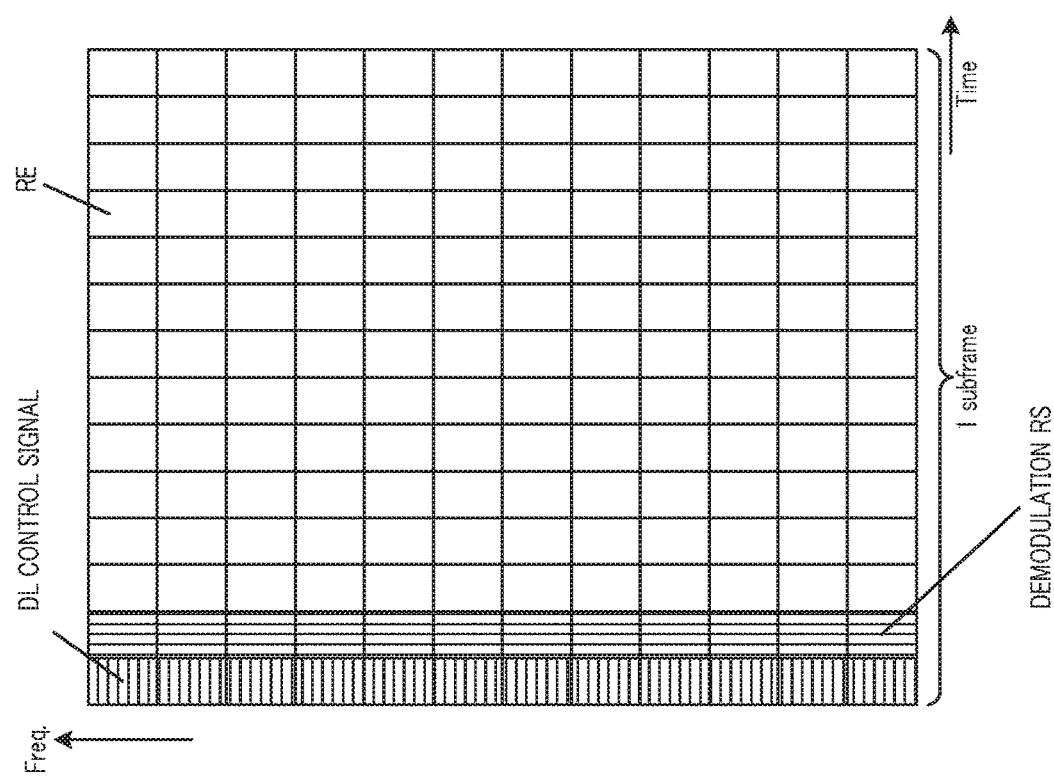
FIG. 6 illustrates a first mapping example of a demodulation RS.

Furthermore, the demodulation RS is mapped to the top symbol of each subcarrier of the RU in the example illustrated in the description. However, the present embodiment is not limited to this as long as the demodulation RS is mapped in one of the symbols on the forward side of the RU (top to k-th (k is an integer equal to or greater than 2, such as k=3) symbols). In this case, the correction RS may be mapped in a symbol behind the symbol provided with the demodulation RS or may be mapped across all of the symbols. For example, as shown in FIG. 6, radio base station 10 may map the DL control signal to the top symbol of each subcarrier and map the demodulation RS on the second symbol of each subcarrier. As shown in FIG. 7, radio base station 10 may map the demodulation RS on the top symbols of part of the subcarriers (at one-subcarrier intervals in FIG. 7). Furthermore, the demodulation RS may be mapped to a plurality of symbols (for example, second and third symbols).

The mapping pattern of the correction RS is not limited to the patterns shown in FIGS. 3A, 4A, 5A, 5B, 5C, and 6. For example, the correction RS may be mapped to one of the subcarriers or may be mapped to two or more subcarriers in 1 RU (such as FIGS. 3A, 4A, and 5A). Furthermore, the correction RS may be mapped to part of the symbols (for example, last symbol) instead of continuously mapping the correction RS on the second and subsequent symbols as shown in FIGS. 3A, 4A, and 5A, or the correction RS may be mapped at certain intervals.

Furthermore, the mapping pattern of the additional demodulation RS is not limited to the pattern shown in FIG. 4B. For example, the additional demodulation RS may be mapped to one of the symbols or may be mapped to two or more symbols in 1 RU. The additional demodulation RS may be mapped in the time direction or may be distributedly mapped to a plurality of symbols and a plurality of subcarriers.

Furthermore, the mapping configuration of the correction RS is implicitly indicated from radio base station 10 to user terminal 20 through the parameters configured to user terminal 20 in the case described above. However, part or all of the mapping configuration of the correction RS may be explicitly notified through signaling. An example of the method of notification includes a method of notifying user terminal 20 of the mapping configuration through higher layer (for example, RRC (Radio Resource Control) signaling and MAC (Medium Access Control)) signaling or physical layer (PHY) signaling. The values indicated by signaling may be, for example, the values of the mapping configuration or values of indices provided to a plurality of patterns of mapping configuration. For example, a pattern of a density serving as a reference of the correction RS may be associated with pattern 1 (index #1). A pattern of a lower density (density is sparse) than the density serving as a reference of the correction RS may be associated with pattern 2 (index #2). A pattern of a higher density (density is dense) than the density serving as a reference of the correction RS may be associated with pattern 3 (index #3).

The parameters to be indicated as the mapping configuration may be, for example, a mapping pattern indicating the mapping positions of the demodulation RS and the correction RS or may be a transmission period of each signal, the number of signals, a sequence to be used, the number of antenna ports to be used, and the like. The values to be indicated may be the configuration values or index values provided to the candidates of a plurality of configuration values. The values to be indicated may be index values collectively provided to the candidates of a plurality of configuration values. When the index values are used, the size of signaling required for the notification of the mapping configuration can be smaller than when the configuration values are indicated.

The downlink communication from radio base station 10 to user terminal 20 is described above. However, embodiments can also be applied to the uplink communication from user terminal 20 to radio base station 10. In this case, the configuration of radio base station 10 (configuration on the transmission side of data (correction RS)) shown in FIG. 1 may be replaced with the configuration of the user terminal in the uplink, and the configuration of user terminal 20 (configuration on the reception side of data (correction RS)) shown in FIG. 2 may be replaced with the configuration of the radio base station in the uplink.

In the case of the uplink, the radio base station specifically uses a PDCCH or the like to notify the user terminal of the control information including the MCS of the uplink, the resource assignment of the uplink, and the like. Note that the user terminal may configure the MCS of the uplink. Next, the user terminal decides the configuration of the correction RS (whether to map, mapping position, density, and the like) based on the control information (for example, parameters (1) to (8)) indicated from the radio base station. The user terminal then maps the demodulation RS and the UL data signal to the uplink resources and transmits the demodulation RS and the UL data signal. The user terminal also maps the correction RS to the uplink resources according to the decided configuration and transmits the correction RS. On the other hand, the radio base station specifies the configuration of the correction RS (whether to map, mapping position, density, and the like) based on the control information indicated to the user terminal. The radio base station then receives the demodulation RS and the UL data signal and receives the correction RS according to the specified configuration. When the correction RS is received, the radio base station uses the correction RS to demodulate the UL data signal.

In this way, as in the case of the downlink, the radio base station can also prevent the reduction in the throughput caused by the overhead of the correction RS while reducing the deterioration of the channel estimation accuracy of each user terminal in the uplink. The user terminal can decide the configuration of the correction RS according to the control information set to the user terminal, and the radio base station can specify the mapping configuration of the correction RS in the user terminal according to the control information set to the user terminal. Therefore, additional signaling for reporting the mapping configuration of the correction RS is not necessary.

(Hardware Configuration)

Note that the block diagrams used to describe the embodiments illustrate blocks on the basis of functions. The functional blocks (constituent sections) are realized by an optional combination of hardware and/or software. Means for realizing the functional blocks is not particularly limited. More specifically, the functional blocks may be realized by one physically and/or logically coupled apparatus. Two or more physically and/or logically separated apparatuses may be directly and/or indirectly (for example, wired and/or wireless) connected, and the plurality of apparatuses may realize the functional blocks.

Figure 8:
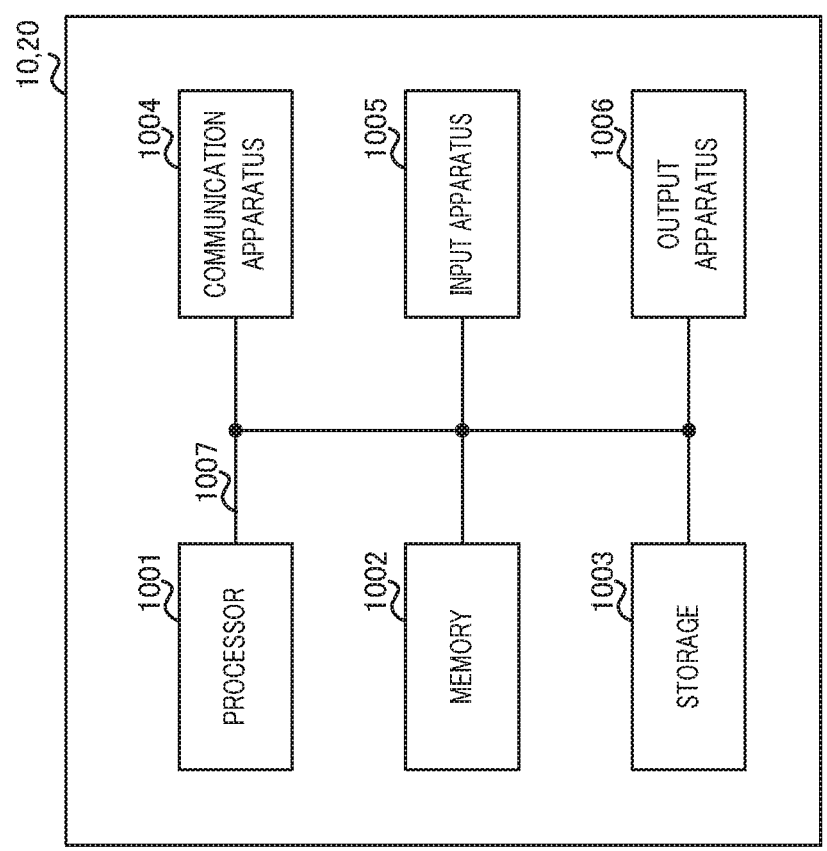
FIG. 8 illustrates an example of a hardware configuration of the radio base station and the user terminal according to the present invention.

For example, the radio base station, the user terminal, and the like according to an embodiment of the present invention may function as a computer that executes processing of a radio communication method of the present invention. FIG. 8 illustrates an example of a hardware configuration of the radio base station and the user terminal according to an embodiment of the present invention. Radio base station 10 and user terminal 20 may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and user terminal 20 may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or by another method. Note that processor 1001 may be implemented by one or more chips.

The functions of radio base station 10 and user terminal 20 are realized by loading predetermined software (program) on the hardware of processor 1001, memory 1002, or the like. Processor 1001 performs operation, and the communication by communication apparatus 1004 or reading and/or writing of data in memory 1002 and storage 1003 is controlled.

Processor 1001 operates, for example, an operating system to control the entire computer. Processor 1001 may be constituted by a central processing unit (CPU) including an interface for peripheral apparatus, a control apparatus, an operation apparatus, a register, and the like. For example, control section 101, transmission signal generation section 102, coding and modulation section 103, mapping section 104, IFFT section 105, FFT section 203, signal separation section 204, control section 205, channel estimation section 206, channel correction section 207, demodulation and decoding section 208, and the like may be realized by processor 1001.

Processor 1001 executes various types of processing according to a program (program code), a software module, or data loaded from storage 1003 and/or communication apparatus 1004 to memory 1002. The program used is a program for causing the computer to execute at least part of the operation described in the embodiments. For example, control section 101 of radio base station 10 may be realized by a control program stored in memory 1002 and operated by processor 1001, and the other functional blocks may also be realized in the same way. Although the various types of processing are executed by one processor 1001 in the description, the various types of processing may be executed by two or more processors 1001 at the same time or in succession. Processor 1001 may be provided by one or more chips. Note that the program may be transmitted from a network through a telecommunication line.

Memory 1002 is a computer-readable recording medium and may be constituted by, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be constituted by, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may be called an auxiliary storage apparatus. The storage medium may be, for example, a database, a server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission section 106, antenna 107, antenna 201, reception section 202, and the like may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) for output to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be set by a single bus or may be set by different buses between the apparatuses.

Furthermore, radio base station 10 and user terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may realize part or all of the functional blocks. For example, processor 1001 may be provided by at least one of these pieces of hardware.

(Notification and Signaling of Information)

The notification of information is not limited to the modes and embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system expanded based on these.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations performed by the base station (radio base station) in the specification may be performed by an upper node depending on the situation. Various operations performed for communication with a terminal in a network constituted by one or a plurality of network nodes including a base station can be obviously performed by the base station and/or a network node other than the base station (examples include, but not limited to, MME (Mobility Management Entity) and S-GW (Serving Gateway)). Although there is one network node other than the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Judgement Method)

The judgement may be made based on a value expressed by 1 bit (0 or 1), based on a Boolean value (true or false based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, may be expressed by values relative to predetermined values, or expressed by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one or a plurality of (for example, three) cells (also called sectors). When the base station accommodates a plurality of cells, the entire coverage area of the base station can be divided into a plurality of smaller areas, and each smaller area can provide a communication service based on a base station subsystem (for example, small base station for indoor, RRH: Remote Radio Head). The term "cell" or "sector" denotes the base station that performs the communication service in the coverage and/or part or all of the coverage area of the base station subsystem. Furthermore, the terms "base station", "eNB", "cell", and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

The terms "determining" and "deciding" used in the present specification may include a variety of operations. "Determining" and "deciding" can include, for example, cases in which judging, calculating, computing, processing, deriving, investigating, looking up (for example, looking up in a table, a database, or another data structure), and ascertaining are assumed as "determining" and "deciding." "Determining" and "deciding" can also include cases in which receiving (for example, receiving information), transmitting (for example, transmitting information), inputting, outputting, and accessing (for example, accessing data in the memory) are assumed as "determining" and "deciding." "Determining" and "deciding" can also include cases in which resolving, selecting, choosing, establishing, comparing, and the like are assumed as "determining" and "deciding." Therefore, "determining" and "deciding" can include cases in which operations are assumed as "determining" and "deciding."

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limited and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be prescribed by the same name (for example, demodulation RS).

The description "based on" used in the present specification does not mean "only based on," unless otherwise specifically stated. In other words, the description "based on" means both of "only based on" and "at least based on."

The "section" in the configuration of each apparatus may be replaced with "means," "circuit," "device," or the like.

The terms "including," "comprising," and modifications of these are intended to be inclusive just like the term "having," as long as the terms are used in the present specification or the appended claims. Furthermore, the term "or" used in the present specification or the appended claims is not intended to be an exclusive or.

The radio frame may be constituted by one or a plurality of frames in the time domain. One or each of a plurality of frames may be called a subframe, a time unit, or the like in the time domain. The subframe may be further constituted by one or a plurality of slots in the time domain. The slot may be further constituted by one or a plurality of symbols (OFDM (Orthogonal Frequency Division Multiplexing) symbols, SC-FDMA (Single Carrier-Frequency Division Multiple Access) symbols, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station performs scheduling for assigning radio resources to each mobile station (such as frequency bandwidth that can be used by each mobile station and transmission power). The minimum time unit of scheduling may be called a TTI (Transmission Time Interval).

For example, one subframe may be called a TTI. A plurality of continuous subframes may be called a TTI, One slot may be called a TTI.

The resource unit is a resource assignment unit of the time domain and the frequency domain, and the resource unit may include one or a plurality of continuous subcarriers in the frequency domain. One or a plurality of symbols may be included in the time domain of the resource unit, and the length may be one slot, one subframe, or one TTI. One TTI and one subframe may be constituted by one or a plurality of resource units. The resource unit may be called a resource block (RB), a physical resource block (PRB: Physical RB), a PRB pair, an RB pair, a scheduling unit, a frequency unit, or a subband. The resource unit may be constituted by one or a plurality of REs. For example, it is only necessary that one RE be a resource in a unit (for example, minimum resource unit) smaller than the resource unit serving as a resource assignment unit, and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a", "an", and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and the notification of the predetermined information may be implicit (for example, by not notifying the predetermined information).

Although the present invention has been described in detail, it is obvious for those skilled in the art that the present invention is not limited to the embodiments described in the present specification. Modified and changed modes of the present invention can be carried out without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2016-252004 filed on Dec. 26, 2016, and the entire content of Japanese Patent Application No. 2016-252004 is hereby incorporated by reference.

INDUSTRIAL APPLICABILITY

An aspect of the present invention is useful for a mobile communication system.

REFERENCE SIGNS LIST

10 Radio base station
20 User terminal
101, 205 Control section
102 Transmission signal generation section
103 Coding and modulation section
104 Mapping section
105 IFFT section
106 Transmission section
107, 201 Antenna
202 Reception section
203 FFT section
204 Signal separation section
206 Channel estimation section
207 Channel correction section
208 Demodulation and decoding section

The invention claimed is:

1. A terminal comprising:
a control section that specifies a density in a time domain of a phase tracking reference signal, PT-RS, mapped to a downlink resource based on a modulation and coding scheme, MCS, scheduled for the terminal and that specifies a density in a frequency domain of the PT-RS based on a number of resource blocks scheduled for the terminal; and
a reception section that receives the PT-RS.

2. The terminal according to claim 1, wherein a parameter related to the PT-RS is configured for the terminal by a higher layer signaling.

3. The terminal according to claim 1, wherein an antenna port of the PT-RS is associated with an antenna port of a demodulation reference signal, DM-RS.

4. The terminal according to claim 1, wherein the density in the time domain commonly configured for a plurality of layers.

5. The terminal according to claim 1, wherein an antenna port of the PT-RS is configured for each of a plurality of layers.

6. The terminal according to claim 1, wherein the resource to which the PT-RS is mapped is configured for each terminal.

7. The terminal according to claim 1, wherein the resource to which the PT-RS is mapped is configured for each carrier frequency.

8. A terminal comprising:
a control section that specifies a density in a time domain of a phase tracking reference signal, PT-RS, mapped to an uplink resource based on a modulation and coding scheme, MCS, scheduled for the terminal and that specifies a density in a frequency domain of the PT-RS based on a number of resource blocks scheduled for the terminal; and
a transmission section that transmits the PT-RS.

9. The terminal according to claim 8, wherein a parameter related to the PT-RS is configured for the terminal by a higher layer signaling.

10. The terminal according to claim 8, wherein an antenna port of a demodulation reference signal, DM-RS, associated with an antenna port of the PT-RS is indicated by a downlink control information, DCI.

11. The terminal according to claim 8, wherein the resource to which the PT-RS is mapped is configured for each terminal.

12. The terminal according to claim 8, wherein the resource to which the PT-RS is mapped is configured for each carrier frequency.

13. The terminal according to claim 8, wherein an antenna port of the PT-RS is configured for each of a plurality of layers.

* * * * *